(12) United States Patent
Zheng et al.

(10) Patent No.: US 6,456,226 B1
(45) Date of Patent: Sep. 24, 2002

(54) NOWCAST OF CONVICTION-INDUCED TURBULENCE USING INFORMATION FROM AIRBORNE RADAR

(75) Inventors: L. Lucy Zheng, Ashburn, VA (US); Richard Burne; Dan T. Horak, both of Ellicott City, MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/620,952

(22) Filed: Jul. 21, 2000

Related U.S. Application Data

(63) Continuation-in-part of application No. 09/348,726, filed on Jul. 6, 1999, now Pat. No. 6,184,816.
(60) Provisional application No. 60/144,913, filed on Jul. 21, 1999, provisional application No. 60/097,536, filed on Aug. 21, 1998, and provisional application No. 60/091,859, filed on Jul. 6, 1998.

(51) Int. Cl.$^7$ .................. G01S 13/95; G08B 23/00
(52) U.S. Cl. .................. 342/26; 342/52; 342/53; 342/54; 342/58; 342/60; 342/61; 342/63; 342/175; 342/195; 342/351; 340/945; 340/963

(58) Field of Search ............ 342/26, 175, 195, 342/52–58, 61, 63, 351, 59, 60; 701/3, 14; 340/945, 963, 968

(56) References Cited

U.S. PATENT DOCUMENTS

| | | | | |
|---|---|---|---|---|
| 4,346,595 A | * | 8/1982 | Gary ................. | 342/26 X |
| 4,521,857 A | * | 6/1985 | Reynolds, III ....... | 342/26 X |
| 5,602,543 A | * | 2/1997 | Prata et al. ......... | 342/26 X |
| 5,657,009 A | * | 8/1997 | Gordon .............. | 342/26 X |
| 5,757,322 A | | 5/1998 | Ray et al. ........... | 342/460 |
| 6,043,756 A | * | 3/2000 | Bateman et al. ...... | 342/26 X |

* cited by examiner

Primary Examiner—Bernarr E. Gregory

(57) ABSTRACT

A convection induced turbulence (CIT) detection system performs a nowcast algorithm to detect CIT along the flight path of an aircraft using power returns from an airborne whether radar. Additional meteorological data is optionally provided by onboard sensors and/or data link from ground sources. A nowcast predicting turbulence along the flight path in the near future alerts the pilot to the likelihood of encountering clear air turbulence.

32 Claims, 22 Drawing Sheets

SCENARIO 1:

SCENARIO 2:

NOWCAST OF CONVICTION-INDUCED TURBULENCE USING INFORMATION FROM AIRBORNE RADAR

CROSS-REFERENCES TO RELATED APPLICATIONS

The application is a continuation-in-part of 09/348,726, field Jul. 6, 1999, now U.S. Pat. No. 6,184,816, and is related to and claims priority from copending U.S. application Ser. No. 60/144,913 for "Nowcast Of Convection-Induced Turbulence Using Information From Airborne Radar And Other Data," filed Jul. 21, 1999; Ser. No. 60/091,859 for "Apparatus and Method for Determining Wind Profiles and for Predicting Clear Air Turbulence," filed Jul. 6, 1998, and Ser. No. 60/097,536 having the same title filed Aug. 21, 1998 now U.S. application Ser. No. 09/348,726 filed Jul. 6, 1999 having the same title, now U.S. Pat. No. 6,184,816.

The application is further related to copending U.S. application Ser. No. 09/621,170, filed on Jul. 21, 2000, which is incorporated herein by reference.

BACKGROUND OF THE INVENTION

This invention relates to the detection of clear air turbulence, vertical windshear and wake vortices; and more particularly, to systems for alerting pilots to the presence of these hazards.

Clear air turbulence (CAT) and wake vortices present potential hazards to aircraft in flight. An aircraft passing through such phenomenon may experience an upset from steady, equilibrium flight. This upset may be severe enough to cause injury to passengers or in severe cases may cause a departure from controlled flight. CAT is a weather phenomenon that is due to vertical wind shear in the atmosphere and usually occurs in temperature inversion layers typically found in the tropopause.

Clear air turbulence has been identified by airlines, FAA, and NTSB as the leading cause of aviation injuries, costing major airlines at least $100 million per year. It is usually caused by convective storms, mountain waves, or jet stream activities. Currently, there is no adequate means to predict turbulence early enough to allow the pilot to avoid it and minimize its impact.

Since the conditions that result in clear air turbulence are not visually apparent nor are they generally detectable by active sensors such as radar, there have been a number of attempts to detect wind shear and clear air turbulence conditions by passive detectors. In particular, attempts have been made to sense air temperature gradients, which are associated with air turbulence, by detecting the radiation emanating from the atmosphere ahead of the aircraft in the infrared and microwave spectral regions. The intensity of the detected radiation varies with the atmospheric temperatures along the line of sight of the detector. Typically these passive systems use a radiometer to measure the thermal radiation from one of the atmospheric gases such as carbon dioxide ($CO_2$), oxygen ($O_2$) or water vapor ($H_2O$) to determine changes in the spatial temperature profile in front of the aircraft. Examples of such approaches based on the infrared emission of $CO_2$ are provided in U.S. Pat. Nos. 3,475,963, 3,735,136, 3,780,293, 3,935,460, 4,266,130, 4,427,306, 4,937,447, 4,965,572, 4,965,573, 5,105,191, 5,276,326 and 5,285,070. Other approaches determine atmospheric temperature by measuring the microwave emission from $O_2$ as described in U.S. Pat. Nos. 3,359,557, 3,380,055, 4,346,595 and 5,117,689.

Systems for measuring atmospheric temperature based on infrared emission from $H_2O$ are described in U.S. Pat. No. 4,266,130 and in the paper by Kuhn et al, "Clear Air Turbulence: Detection by Infrared Observations of Water Vapor" in Science, Vol. 196, p.1099, (1977). In addition, there have been several papers written describing these types of passive infrared systems including: S. M. Norman and N. H. Macoy, "Remote Detection of Clear Air Turbulence by Means of an Airborne Infrared System," AIAA Paper No. 65–459 presented at the AIAA Second Annual Meeting, San Francisco, CA, July 26–29, 1965; and R. W. Astheimer, "The Remote Detection of Clear Air Turbulence by Infrared Radiation" in *Applied Optics* Vol. 9, No. 8, p.1789 (1970). In U.S. Pat. No. 4,346,595, Gary describes a microwave radiometer for determining air temperatures in the atmosphere at ranges of about 3 km from the aircraft for the purpose of detecting the height of the tropopause and the presence of temperature inversions. He teaches that by flying the aircraft above or below the tropopause or temperature inversion layer, it is possible to avoid CAT. Since the effective range of the microwave radiometer is relatively short, the system doesn't provide sufficient warning time for the aircraft to avoid the CAT condition. The present invention has detection ranges on the order of 100 km which will allow time for the aircraft to change altitude to avoid CAT.

A number of the above systems were not successful or were only partially successful because they were based solely on the measurement of atmospheric temperature in order to predict the presence of turbulence. A more reliable indication of atmospheric turbulence can be realized by determining the Richardson number, $Ri$. The use of the Richardson number to determine the stability of the atmosphere is well known in meteorology (see, for example, D. Djuric, "Weather Analysis," Prentice Hall, Englewood Cliffs, N.J., 1994, p. 64). In U.S. Pat. No. 5,117,689, Gary discussed the correlation of the reciprocal of the Richardson number with the occurrence of CAT conditions. The Richardson number, $Ri$, contains two components: (1) the vertical lapse rate of potential temperature and (2) the wind shear which is related to the horizontal temperature gradient. A number of the prior art discussions measure the vertical temperature lapse rate. Gary used the inertial navigation system (INS) to measure the East-West and North-South components of the wind (the wind shear) along with a microwave radiometer to measure the air temperature vertical lapse rate. This information is then used to calculate the Richardson number or its reciprocal. The deficiency of the system described in this patent (U.S. Pat. No. 5,117,689) is that it determines the Richardson number at relatively close ranges (less than 3 km) and therefore does not provide advance warning of the CAT condition and that it measures the wind shear only at the aircraft.

Previous approaches for the determination of the range and probability of CAT can be summarized as follows:

U.S. Pat. No. 5,276,326 to Philpott determines turbulence as a function of temperature vs. range through the analysis of infrared radiometer signals at two or more discrete wavelengths. The temperature associated with a given range as a function of wavelength is then derived through a matrix inversion process. This transition is difficult and requires noise and error free input data to yield valid results. Gary overcomes the multiple wavelength difficulty in U.S. Pat. No. 4,346,595 by measuring effective temperature and range at a single wavelength, however no attempt is made to determine the probability of clear air turbulence using the Richardson number ($Ri$). In U.S. Pat. No. 5,117,689, Gary teaches the significance of the Richardson number in CAT prediction but does not suggest a method to derive $Ri$ directly from radiometric measurements of horizontal and vertical temperature lapse rates obtained by combining azimuth and elevation scanning with the aircraft motion to produce a temperature map.

The above methods for airborne detection of clear air turbulence require the use of an aircraft sensor. Both infrared and radar sensors have been suggested for use. The practical difficulties involved with implementing these systems are several. First, the extremely small changes in temperature associated with the rising air current must be detected by those systems using infrared sensing. This task can be difficult to accomplish in thermally noisy environments or at long range. Second, such infrared systems require a clear lens to protect the infrared sensor. Real world flight conditions make the protection and maintenance of the lens such that reliable readings could be had costly and difficult. Third, those systems employing radar must have either a dedicated radar or must employ existing aircraft radar originally designed and dedicated for other purposes. Dedicated radar systems, such as LIDAR, tend to be extremely heavy which imposes fuel and capacity costs on the aircraft operator. The operator also must shoulder the additional burden of acquiring and maintaining a separate radar system. Fourth, the sensor is required to sweep out a large expanse of area in to either side of the aircraft and at various ranges in front of the aircraft. This requirement means that the sensor and the associated signal processing system must acquire and analyze a large quantity of data. Detecting the subtle changes indicative of turbulence becomes more difficult at long range. Furthermore, the bandwidth and time dedicated to the sensing activity can become onerous when the sensor is shared with other tasks, or when rapid update rates are desired.

Other solutions for avoiding invisible flight hazards such as CAT involve the use of mathematical atmospheric models. In particular, wake vortices models have been promulgated for several aircraft types. Air traffic controllers in the United States employ these models to develop separation rules such that one aircraft's vortices do not pose a hazard to others. One such model used by controllers is called AVOSS, or Aircraft Vortex Separation System. Such models do not actually detect the presence of vortices or turbulence, but merely indicated theoretical behaviors and regions of likely occurrence.

SUMMARY OF THE INVENTION

As discussed herein, radar data alone is usually insufficient to give accurate nowcast of turbulence. Some meteorological data useful for either developing or refining a turbulence nowcast can only be obtained through uplinking data from a ground-based information source via a data link. However, the limited bandwidth of the data link means that very little of the possible gigabytes of storm data available from ground sources are able to be uplinked to the aircraft. This embodiment of the invention overcomes the difficulties associated with uplinking ground-based storm data by applying observational data to short-term prediction algorithms. This embodiment of the invention is a method for determining a nowcast of aviation turbulence without utilizing other meteorological data to supplement radar data. Preferably, the method of this invention utilizes data input from airborne weather radar and onboard thermal sensors to predict convection induced turbulence (CIT).

According to the present invention, observational data and short-term prediction algorithms are combined to provide a turbulence nowcast that estimates the probability, intensity, and location of turbulence with an adequate lead-time that allows the pilot to react by avoiding the dangerous area completely or choosing the best route to minimize the impact of turbulence encounter.

According to one aspect of the invention, an airborne convection induced turbulence nowcast system includes an on-board memory for storing a signal representative of a radar power return from a weather condition; and an on-board processor coupled to the memory. The processor is a computer adapted to process said radar power return data to provide spatial and temporal weather condition information, determine physical parameters of the weather condition as a function of the spatial and temporal whether condition information, and process the physical parameters as a function of predetermined diagnostic parameters to determine turbulence information and generate a nowcast of convection induced turbulence.

According to various aspects of the invention, the physical parameters are preferably one or more of a maximum upward G-factor, a maximum downward G-factor, a minimum moment of inertia of the radar reflectivity, a maximum moment of inertia of the radar reflectivity, a ratio of the minimum and maximum moments,of inertia, a vertical velocity of wind, a mean reflectivity of an upwind area, a mean reflectivity of a downwind area, and a ratio between the mean reflectivity of upwind and downwind areas. The maximum radar reflectivity and the first moment of the radar reflectivity are additional physical storm parameters for use with the nowcast algorithm to predict the locations of convection induced turbulence.

According to other aspects of the invention, the diagnostic parameters include one or more of a pattern of the weather condition, an extent of the weather condition, an intensity of the weather condition, maturity of the weather condition, and a motion of the weather condition.

According to various aspects of the invention, the processor of the airborne convection induced turbulence nowcast system is further adapted to determine a turbulence index as a function of the turbulence information; and the nowcast is further generated as a function of turbulence index. The on-board memory of the nowcast system also stores convection induced turbulence information as a function of predetermined weather condition features. The processor is further adapted to extract features from the radar power return signal corresponding to the predetermined weather condition features, and retrieve from the on-board memory the convection induced turbulence information corresponding to the extracted features.

According other aspects of the invention, the turbulence index is a weighted and normalized summation of various combinations of the diagnostic parameters.

According to various other aspects of the invention, the processor of the nowcast system of the invention is further coupled to receive a signal representative of additional meteorological data, and the processor is further adapted to process the additional meteorological data in combination with the turbulence information to generate the nowcast of convection induced turbulence. Furthermore, the additional meteorological data are preferably data that indicates at least one or more of the severity of the weather condition, the current developmental stage of the weather condition, and the type of weather condition under consideration. The additional meteorological data optionally include lightning data.

The present invention also includes the methods implemented by the convection induced turbulence nowcast system of the invention and various aspects thereof.

According to yet other aspects of the invention, the present invention provides a novel method for processing radar return data to determine the storm center and horizontal wind direction at aircraft cruise altitudes, thereby defining the probable location of the turbulence existing outside of significant radar reflectivity area.

According to various aspects of the invention, the nowcast method of the invention determines the center of mass and minimum moment of inertia of radar reflectivity of the storm. The radar reflectivity area is divided into upwind and downwind areas by a line passing through the storm center of mass perpendicular to the axis of minimum moment of inertia. The mean radar reflectivity of each area is computed. The horizontal wind direction is determined using the criteria that the area with larger mean radar reflectivity is the upperwind portion and the other area with smaller mean value is the downwind portion. This horizontal wind information is supplied to the nowcast algorithm of the invention, preferably in combination with information describing the type of storm encountered, to determine the location, the probability, location, and intensity of turbulence.

DESCRIPTION OF THE SPECIFIC EMBODIMENTS

AIRBORNE SENSOR DETECTION

Figure 1A:
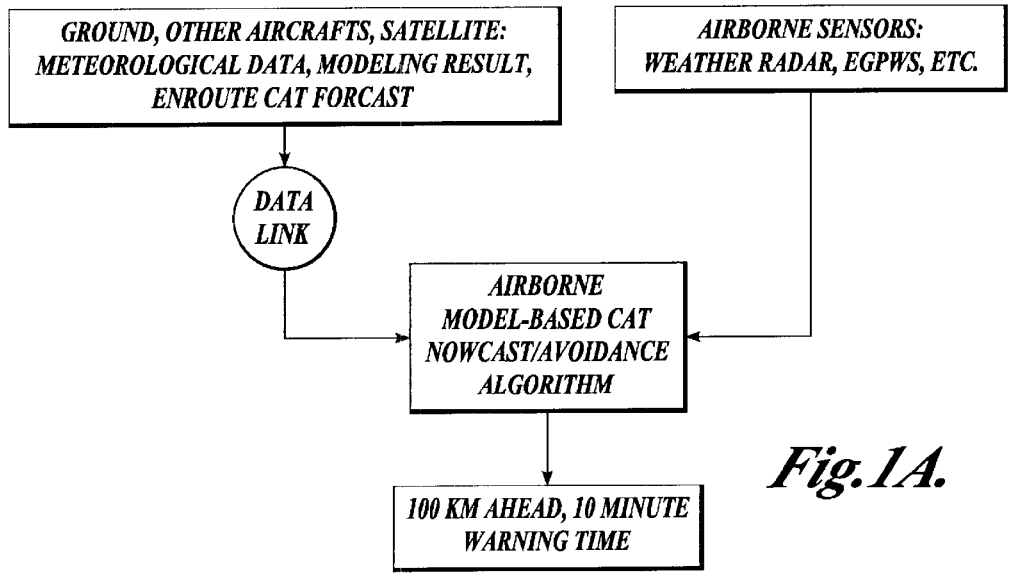
FIG. 1A is a conceptual diagram of a model-based airborne CAT nowcast/avoidance system.

FIG. 1A is a conceptual diagram of a model-based airborne CAT nowcast/avoidance system. Inputs to the model are from data link and/or from onboard sensors.

FIG. 1A illustrates one embodiment of a model-based airborne CAT nowcast/avoidance system. A data link provides large-scale weather information from ground stations and environmental data from other airplanes. An airborne system combines the information from the data link with onboard sensors to enable CAT nowcast for an area about 100 km ahead. This will give pilots about 10 minutes of warning time. The proposed system overcomes the difficulties associated with a purely ground-based uplinking system. Such a system requires a large communication bandwidth and makes the airplane dependent on ground stations and a communication link with the ground. An airborne system combined with selective data-linked inputs will decrease such risk and gives more control to the pilot.

The detection of CAT is a difficult problem. CAT generally occurs as one of four types: turbulence near thunderstorm (TNT), mountain wave turbulence (MWT), clear-air turbulence in the free atmosphere without any visible activity (CAT), and low-level turbulence (LLT). TNT constitutes a large amount of information, the nowcast on TNT requires less real-time computation and does not depend as much on data link information. The algorithms and methodologies developed for TNT and MWT nowcast can be expanded and applied for CAT warning.

Using data from ground and airborne radar, a small-scale model can simulate weather development with sufficient accuracy for TNT nowcast. Given the limited computational capacity on the airplane, a model aimed at a small area along the flight path can be developed by modifying existing large-scale meteorological models. This airborne modeling system takes advantage of all the information it can get from a ground-based system (such as large-scale weather information and modeling results) and reduces the computation complexity by narrowing the field of regard for the onboard modeling and prediction algorithm.

Most existing models are for meteorological research and forecast with large spatial and temporal scale and also stimulate many meteorological parameters not of interest here. An embodiment of the present invention can employ a simplified model to establish an airborne model running on a personal computer that gives information for limited spatial and temporal bounds: about 100 km along the flight path and 10 minutes of warning time to the pilots. A nested-grid modeling approach is used in a preferred embodiment. Most ground-based systems provide 36-km to 12-km regional weather forecast every hour. The result can be used to provide initial and boundary conditions for further air-borne finer-grid modeling. The radar data can be used to correct the coarse-grid modeling result. For example, inaccurate position and speed of a convective supercell forecasted by a ground-based system can be corrected by radar data and more accurate initial and boundary conditions can be formed for further airborne small-scale modeling.

Figure 1B:
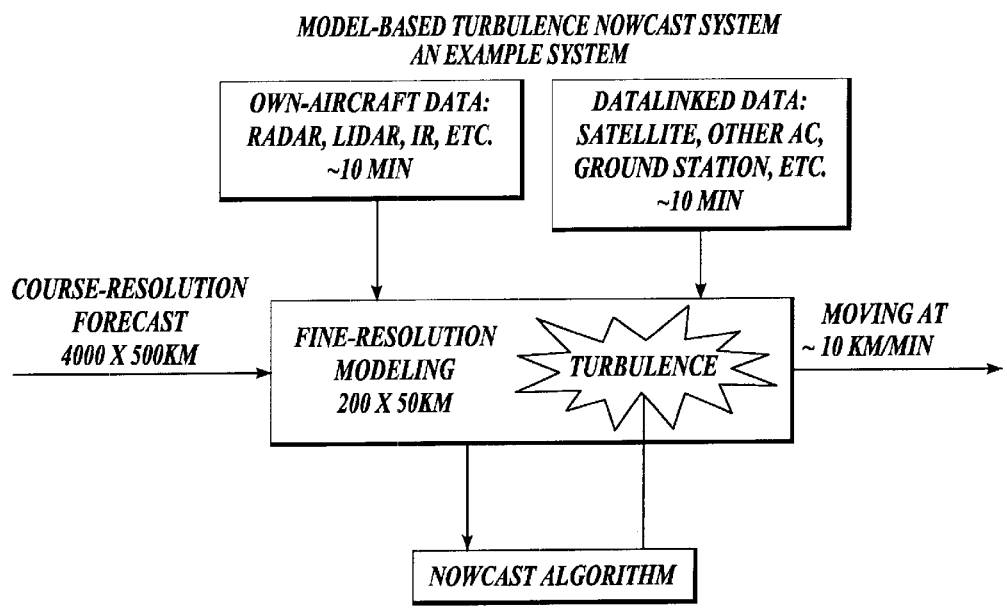
FIG. 1B is a conceptual diagram of an example system for implementing the invention.

FIG. 1B is a more detailed depiction of a preferred embodiment of the invention. Coarse resolution forecasts for large grids, e.g., 4,000 by 500 km are received periodically from land-based weather stations. Own-aircraft observational data such as Radar, Lidar (light detection and ranging), and infrared (IR) as well as data-linked data such as data linked from satellites, other aircraft, or ground stations is updated about every 10 minutes and used to model a nested grid of about 200 by 50 km which is oriented to include the path of the aircraft. The fine resolution modeling data is processed by a nowcast algorithm to determine if CAT is likely to occur in the path of the aircraft.

Several existing models known to those of skill in the art may be modified as described above for use in the present invention. They are NASA's terminal area simulation system (TASS), see, e.g., F.H. Proctor, The Terminal Area Simulation System, NASA Contract Report 4046, 1987, and integrated electromagnetic sensor simulation (IESS), PennState/NCAR's meso-scale model 5 (MM5), see. e.g., Phillip L. Haagenson et al, The Penn State/NCAR Mesoscale Model (MM5) Source Code Documentation, March 1994, the Advanced Regional Prediction System (ARPS), see, e.g., Ming Xue et al., "ARPS Version 4.0 User's Guide," Center for Analysis and Prediction of Storms (CAPS), University of Oklahoma, Norman Okla., 1995.

The uplinked data transmitted to the aircraft from ground stations contains information on possible vortex characteristics and/or weather phenomenon. The ground based radar systems may include weather, wake vortices and/or turbulence detection information.

In a preferred embodiment of the invention, this information is combined or utilized onboard the aircraft to develop a real time airborne model of where these hazardous phenomenon are likely to be encountered. The predictive model can be used to assert an aural and/or visual warning to the pilot.

In a preferred embodiment, this predictive model is combined with detection. The predictive model is employed by the invention to direct the sensor system to scan those areas of interest. Thus, the present invention has the advantage of providing faster update rates than would be available in a prior art system. The present invention has the further advantage of minimizing the number of radar scans that must be dedicated to this task when the radar or sensor is shared amongst various data gathering functions.

The information uplinked to the airborne detection system assists that system in defining the particular indicia of the turbulence hazard. This information enables the present invention to better discriminate amongst the sensor data and improves the reliability that a hazard will be detected. In addition, this information reduces the chances that a false warning will be output to the pilot. As is well known to those of skill in the art, frequent false, or nuisance, warnings cause the cockpit crew to ignore subsequent and possibly valid warnings. Therefore, it is desirable to reduce the number of false alerts in the manner taught by the present invention.

In one embodiment, the invention contains a database of terrain information. Optionally, this terrain data may also be uplinked to the aircraft via a communications link or may be contained in an existing aircraft system, such as, for example, on Enhanced Ground Proximity Warning System (EGPWS) or a navigation database. Terrain data may also be acquired via terrain data scans of the onboard weather radar. The terrain data may be used by the predictive modeling system of the present invention to identify areas of possible turbulence hazards or to assist in modeling the propagation of wake vortices and dissipation of turbulence. Such information would be particularly useful in the vicinity of airports during the landing and takeoff phases of flight.

Data uplinked to the aircraft may be uplinked via satellite telecommunications systems as known to those of skill in the art. The data uplink may also occur via known and existing onboard telecommunications devices such as ACARS or HF radio communications links. Optionally, the present invention may include its own dedicated hardware for receiving these information updates.

Warnings provided to the pilot may include an aural and/or visual warning. In one embodiment, the visual warning includes icons that symbolize various types of weather phenomenon including clear air turbulence and vortices. In another embodiment of the present invention the visual display includes icons overlaid on top of the weather radar picture.

Figure 1C:
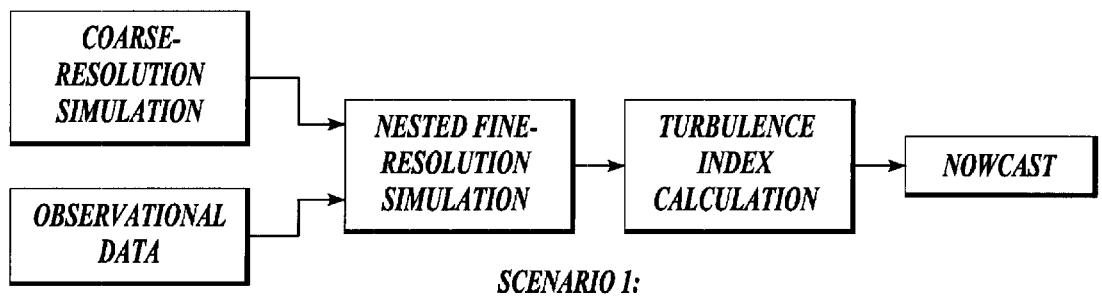
FIG. 1C is a flow chart depicting the steps of a first embodiment of the invention.
Figure 1D:
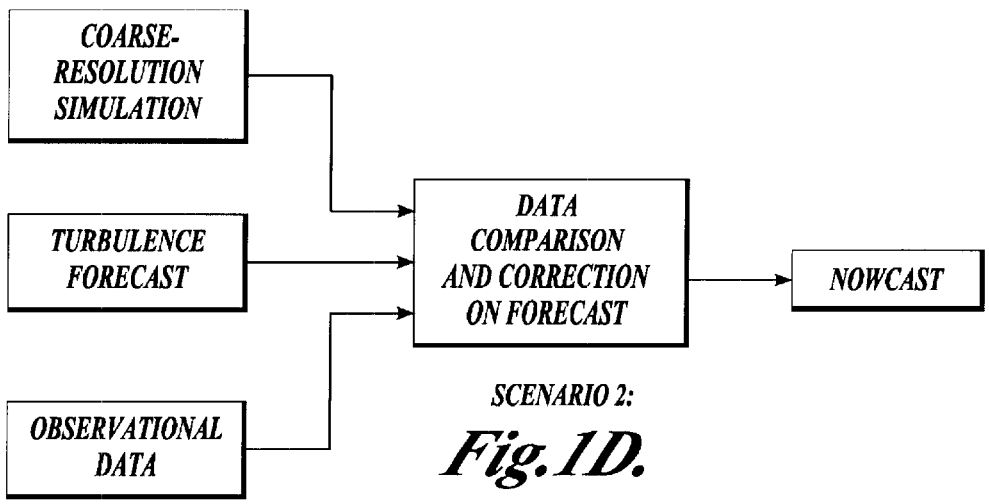
FIG. 1D is a flow chart depicting the steps of a second embodiment of the invention.

Alternative preferred embodiments of a computational method are depicted in FIGS. 1C and 1D. Referring first to FIG. 1C, coarse resolution simulation data and observational data are provided to the onboard computer which then performs a nested fine-resolution simulation of atmospheric conditions along the aircraft flight path. This fine resolution data provides the parameters to perform a turbulence index calculation which is the basis of a "nowcast" provided to the aircraft crew updating them on the possibility of encountering CAT. The coarse resolution data provides a "forecast" of weather events over a long period, e.g., 24 hours, whereas a "nowcast" provides much more accurate predictions of weather phenomena in the very near future, e.g., 10 to 30 minutes. The various functions. performed will now be described.

Coarse resolution simulation data may be provided to the aircraft either through a data link or be pre-loaded into the aircraft prior to take-off. A "snapshot" of data could be stored in no more than 6 MB in compressed form and could include data covering, for example, an area of 4,000 by 500 km with 36-km horizontal resolution and 20 layers of vertical resolution. A snapshot data includes all the simulation parameters for each point in 3-D grid space. If the computer is to be pre-loaded with hourly forecast data for 10 hours of flight time, the total amount of data would be about 60 Mb. Forecast data from the National Center for Environmental Prediction (NCEP) is readily available for this purpose.

During flight, observation data will be gathered to the airborne computer. These data could be gathered by detectors such as radar, Lidar, infrared remote sensors, and other temperature and wind sensors. The data could also be gathered by sensors from satellites. The detectors could either be located on the aircraft, on other aircraft near the flight path, ground stations, or on satellites. A data link is used to transmit data from locations not on the aircraft to the aircraft. Data conditioning and interpolation will be applied to eliminate bad data points and to fill in empty points. Meteorological data variables are computed from these data to be used for fine-nested grid simulation.

The observational data and coarse-resolution data are used for nested fine-resolution simulation. The coarse resolution data, e.g., forecast data from NCEP, is used to initialize the coarse grid and establish boundary conditions and initial parameters for modeling fine grids, nested within the coarse grids, to improve the data. Mathematical systems for performing nested grid modeling include the Advance Regional Prediction System (ARPS), Xue et al., "ARPS User's Guide Version 4.0," Center for Analysis and Prediction of Storms (CAPS), 1995 and NCAR'S Clark-Hall Code Model, Clark et al., "Source Code Documentation for the Clark-Hall Cloud-Scale Model Code Version G3CH01," NCAR, Boulder, Co., 1996.

The meteorological variables calculated by the nested grid simulation are utilized to calculate the turbulence index. Particular variables used include turbulence kinetic energy (TKE), Richardson's number (see below), vertical windshear, the deformation index, eddy dissipation rate, TI2, etc. The turbulence index is defined as the weighted and normalized summation of various combinations of the these parameters. Weighting factors are assigned by using experience formulae, which are developed by comparing the numbers against available flight data with real turbulence encounters. The values depend on the location of the aircraft (mountainous or flat terrain), seasons, and other parameters.

The nowcast is based on the value of the calculated turbulence index. If the calculated turbulence index for a location along the flight path exceeds a pre-defined turbulence threshold then a turbulence warning will be issued for its location, time, and intensity.

Referring now to FIG. 1D, this method requires less computational power from the aircraft computer. As in the method of FIG. 1C, coarse resolution simulation and observational data is provided. In this case a turbulence forecast is also provided. The onboard computer utilizes the observational information to correct the forecast to generate a nowcast.

Many agencies and service centers issue aviation turbulence forecasts based on coarse-resolution modeling results. The accuracy may be poor due to the nature of the forecast, i.e., relative long time span, low resolution, and local weather phenomena not included in simulation. However, the forecast result can be used together with observational data to improve its accuracy and give a good nowcast product.

The accuracy of the coarse-resolution turbulence forecast can be improved by comparing observational data with coarse-resolution data because errors in the forecast can be corrected by results of localized observations. For example, the forecast may predict turbulence in location (x,y) at time t, with associated wind and temperature profiles in an area A. However, the observational data may indicate similar wind and temperature profiles but in a different area B. This difference may be caused by inaccuracies in coarse-resolution simulation. By comparing the two sets of data, the airborne computer may issue a turbulence warning at a shifted location from area A. Another example is when the coarse-resolution data and observational data have overlapping meteorological profiles, but with different intensities. This will lead to turbulence nowcast with increased or decreased severity than previously forecast.

Figure 1E:
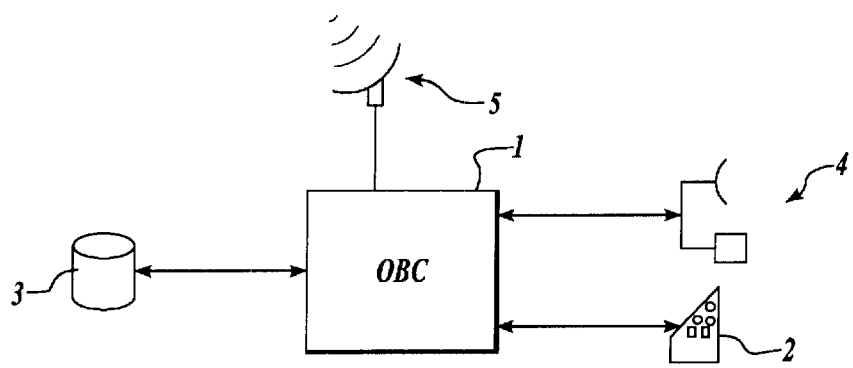
FIG. 1E is a block diagram of a preferred embodiment.

An onboard system for providing a CAT nowcast is depicted in FIG. 1E. An onboard computer (OBC) 1 executes software that implements the nested grid algorithm and CAT nowcast as described above. This nowcast information is provided to cockpit instrumentation 2 which provides aural or visual CAT nowcast alerts 4 to a pilot. Onboard storage 3 is used to store pre-loaded coarse simulation data, terrain database information, and program code. Onboard sensors 4 and a data-link 5 provide observational data to the OBC 1. Further, the data-link can be used to provide coarse simulation data or program code to be stored in the onboard storage. All or some of the elements of the system depicted in FIG. 1E may be located onboard the aircraft.

Figure 2A:
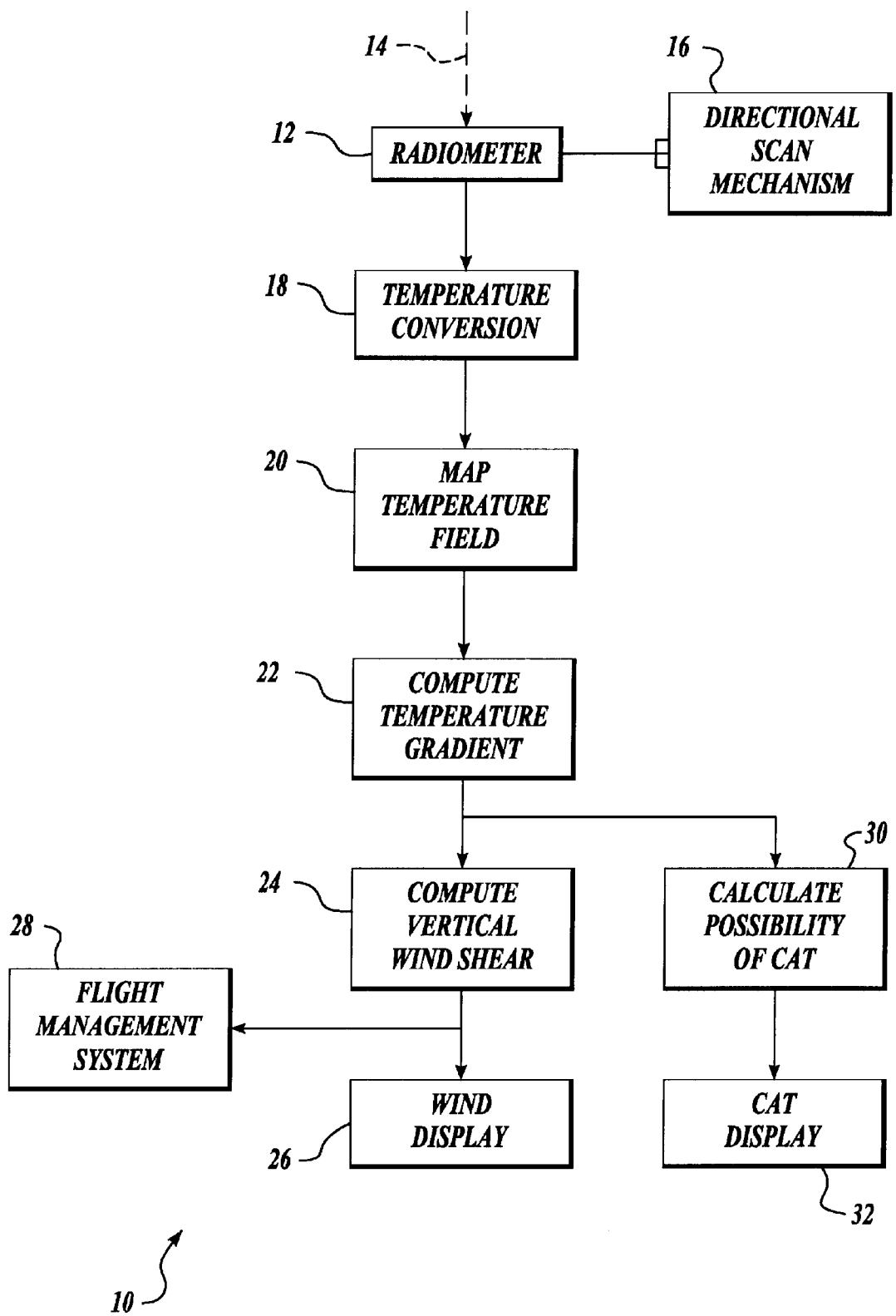
FIG. 2A is a functional block diagram of a CAT sensing system according to an embodiment of the invention.

FIG. 2A provides an overview, in the form of a functional block diagram, of the operation of an airborne sensing device 10 for installation in an aircraft to detect wind vector difference and clear air turbulence.

As described above, the information generated by the airborne sensing device 10 may be utilized as observational data to refine coarse simulation data in the nested grid approach or to refine CAT prediction data. Alternatively, the sensor data may be independently processed to predict the occurrence of CAT along the flight path of the aircraft.

Installed in a forward and partially sideways-looking location of the aircraft, such as the nose or a leading portion of a wing, is a passive detector 12, preferably a radiometer, for receiving infrared radiation from the atmosphere as indicated by a dashed line 14. Also, as indicated by a block 16, the radiometer 12 is connected to a directional scanning mechanism which permits the radiometer 12 to receive the radiation 14 from different directions in both the azimuth and vertical directions or in only the azimuth direction.

Shown at block 18, the apparatus 10 converts the sterance or energy L at a particular wave length $\lambda$ of the radiation 14 as detected by the radiometer 12 into a value $T_{eff}$ which represents the temperature of the atmosphere at an effective range $R_{eff}$ from the aircraft. The concept of converting the radiation 14 into temperature $T_{eff}$ and the effective range $R_{eff}$ will be described below.

Figure 2B:
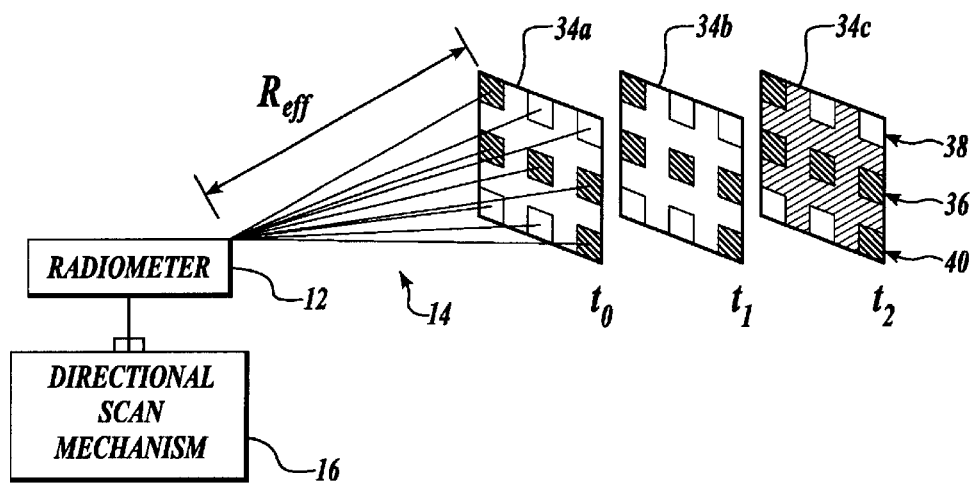
FIG. 2B is pictorial representation of a scanning array illustrating the operation of a radiometer in the invention of FIG. 2A at three time intervals according to an embodiment of the present invention.

Then, as indicated at a block 20, the $T_{eff}$ values obtained will be used to create a horizontal or vertical temperature map of atmospheric temperature ahead of the aircraft as illustrated in FIGS. 2B–2G. As the aircraft progresses along its line of flight, the system data is collected as shown in FIG. 2B. The apparatus then generates a temperature map as indicated at 20.

The temperature mapping 20 is used to compute horizontal temperature gradients $\nabla T$, indicated at a block 22, between the temperatures T, contained in the map 20 in a horizontal plane.

As represented by a block 24 and discussed below, the horizontal temperature gradients $\nabla T$ can be used to compute vertical wind vector difference for flight levels ahead as well as above and below the aircraft.

Effective use of the wind vector difference information generated at 24 can be made, as shown at a block 26, by displaying the wind vector difference at flight levels above or below the aircraft in order to provide the air crew with information as to winds that might be more favorable. This information 24 can also be used as an input to a flight management system, indicated by a block 28, so that it can be combined with other flight parameters to provide guidance as to the most efficient flight regime. In addition, this information 24 can be used to compute the probability of clear air turbulence, as indicated by a block 30 that in turn can be used as an input to a clear air turbulence display or warning system as shown by a block 32.

The following is a more detailed description of the various elements and concepts of the invention as shown in the block diagram of FIG. 2A.

For example, FIG. 2B provides an illustration of the operation of the radiometer 12 in conjunction with the directional scan mechanism 16. In this case the scan mechanism 16 directs the radiometer 12 so as to receive radiation 14 from what in effect are 3×3 arrays 34a, 34b and 34c of points in the atmosphere ahead of the aircraft collecting sterance associated with an effective range $R_{eff}$ at time intervals $t_0$, $t_1$ and $t_2$. In the preferred embodiment of the invention, a middle row 36 of the arrays 34a–c is located at the aircraft's flight level while an upper row 38 is located at a level intermediate between the flight level and an upper flight level and a lower row 40 is located at a level intermediate between the flight level and a lower flight level. An illustration of the flight levels is provided in FIG. 2G. The radiometer 12 can be any suitable commercially available radiometer or a radiometer of the type described in the above referenced patents such as U.S. Pat. No. 4,937,447 to Barrett, which is hereby incorporated by reference. In another preferred embodiment, only one horizontal temperature map at one level is used for determining wind difference.

Figure 2C:
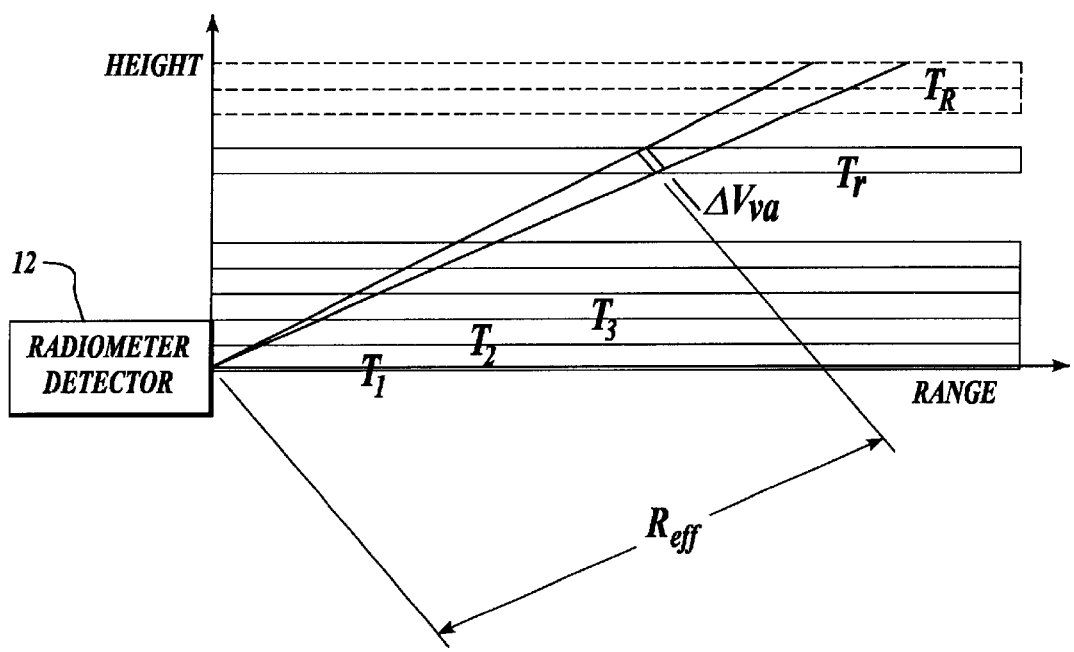
FIG. 2C is a pictorial representation of a section of the atmosphere illustrating the operation of the radiometer of FIG. 2A according to an embodiment of the present invention.

Referring also to FIG. 2A and FIG. 2C, the temperature conversion 18 of each point in the arrays 34a–c is accomplished by translating the radiance $L(\lambda)$ received by the radiometer 12, where the wavelength is $\lambda$, into a signal that is associated with a temperature $T_{eff}$ of the volume of air seen by the radiometer. The temperature, $T_{eff}$, is associated with the effective range, $R_{eff}$, which is the weighted average distance of the signal reaching the radiometer 12. This use of $R_{eff}$ is only useful in conditions for which $R_{eff}$ does not vary significantly during aircraft flight across reasonable distances at a fixed altitude. It has been found that $R_{eff}$ does not vary significantly for normal flight conditions, i.e., $R_{eff}$ is determined by only the wavelength $\lambda$, the altitude and latitude of the aircraft and the particular time of year. This has been verified through the use of the FASCODE program. The FASCODE program is a computer model of atmospheric transmission and radiance in the infrared. This program is described and identified in the aforementioned Barrett, U.S. Pat. No. 4,937,447. The following Table 1 is a table illustrating the FASCODE (using the mid-latitude, winter atmosphere program) computed effective range $R_{eff}$ vs. $\lambda$ in the case that $\lambda$ falls within the preferred band of wavelengths of $CO_2$ emission for a zenith angle of 90 degrees and an altitude of 35,000 ft.

TABLE 1

| Wavelength ($\mu$m) | Effective Range (km) |
|---|---|
| 12.2 | 121 |
| 12.3 | 106 |
| 12.4 | 98.2 |
| 12.5 | 84.4 |
| 12.6 | 76.6 |
| 12.7 | 91.8 |
| 12.8 | 10.5 |
| 12.9 | 10.6 |
| 13.0 | 89.3 |

It has been found that the wavelength 12.2 $\mu$m of $CO_2$ is particularly effective at measuring $T_{eff}$ associated with a range $R_{eff}$ of approximately 120 km for one altitude and latitude. It should be noted that one of the advantages of the invention is that it makes use of previously computed values of $R_{eff}$ so that it is possible to provide accurate maps of atmospheric temperature. Also it is possible to store tables of $R_{eff}$ vs. Altitude and $\lambda$ vs. $R_{eff}$ such as shown in the Table 1 above in order to adjust the sensitivity of the system and the effective range for various conditions. Alternatively, it is possible to use more than one wavelength $\lambda$ to measure more than one $T_{eff}$ at corresponding ranges $R_{eff}$ from the aircraft.

The radiance $L(\lambda)$ detected by the radiometer 12 is a function of the temperature of the naturally occurring $CO_2$ in the atmosphere. It is possible to associate the temperature of the air in $\Delta V_{vol}$ shown in FIG. 2C with a given signal. The total signal, $L(\lambda)$, is the sum of the contributions, $L(\lambda)_i$ of signal from each volume element i along the line of sight of the radiometer 12.

Thus $$L(\lambda) = \sum_i L(\lambda)_i = \sum_i S_i \tau_i \qquad (1)$$

where $S_i$ is the radiance intercepted by the detector from a volume element i and $\tau_i$ is the transmission of the radiance between the volume element i and the detector. The temperature $T_{eff}$ is associated with $L(\lambda)$, where $T_{eff}$ is the temperature of a blackbody source which produces the same radiometer signal as $L(\lambda)$. The effective distance $R_{eff}$ is defined according to the equation $$R_{eff} = \frac{\sum_i R_i L(\lambda)_i}{\sum_i L(\lambda)_i} \qquad (2)$$

indicated at 18 of FIG. 2A, the temperature $T_{eff}$ is associated with $R_{eff}$ and a map is generated at 20 with the temperature $T_{eff}$ at a distance $R_{eff}$ in the appropriate direction from the aircraft. For normal flight conditions, $R_{eff}$ does not vary significantly and is determined only by altitude and latitude for a given time of year. With respect to FIG. 2C, the altitude of $\Delta V_{vol}$ for a $R_{eff}$ of 120 km will be about 1000 ft. above the flight level of the aircraft due to the earth's curvature assuming the radiometer 12 is directed toward the horizon.

Figure 2D:
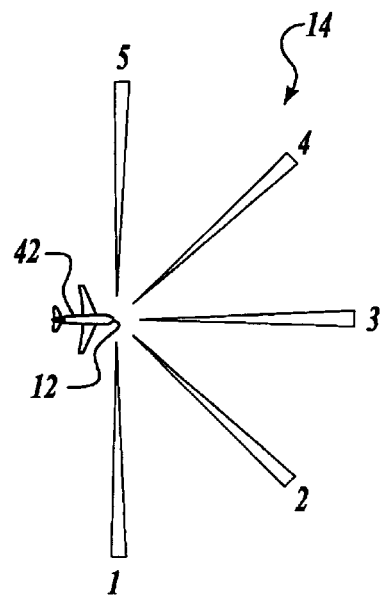
FIG. 2D is a pictorial representation of an aircraft operating the radiometer of FIG. 1 in a horizontal scan mode according to an embodiment of the present invention.
Figure 2E:
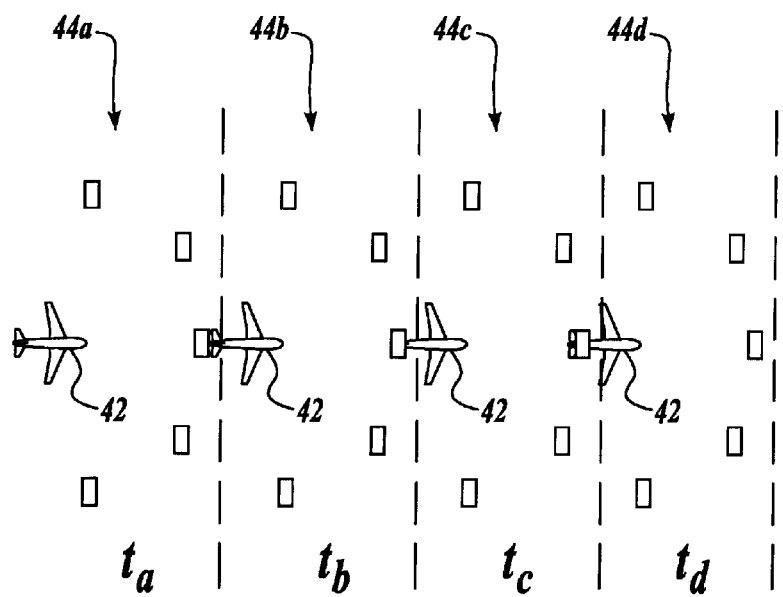
FIG. 2E is a pictorial representation of an aircraft acquiring a horizontal temperature map according to the invention of FIG. 2A.
Figure 2F:
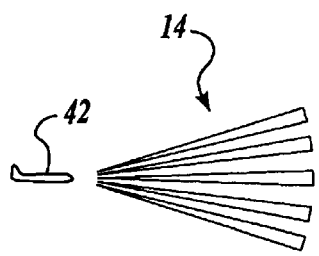
FIG. 2F is a pictorial representation of an aircraft operating the radiometer of FIG. 1 in a vertical scan mode according to an embodiment of the present invention.

FIGS. 2D–2F illustrate how the temperature mapping 20 can be accomplished. In FIG. 2D, an aircraft 42 having the radiometer 12 mounted in its nose causes the radiometer 12 to perform an azimuth scan of 180°. At each of the five positions shown in FIG. 2D, the radiometer 12 will detect the radiance 14. In this manner a horizontal temperature map is generated. The radiometer can detect signals sufficiently fast that the motion of the aircraft can be ignored. FIG. 2E shows a series of locations indicated by a set of rectangular boxes $44_{a-d}$ that correspond to a set of time intervals $t_{a-d}$ as the aircraft 42 proceeds along its flight path, where the temperatures $T_{eff}$ detected for each location $44_{a-d}$ can be stored in memory. Similarly, as illustrated in FIG. 2F, the radiometer 12 in the aircraft 42 can perform a vertical scan so that temperatures of locations above and below the flight path can be mapped. As a result, it is possible to generate temperature maps for horizontal planes above and below the aircraft 42.

By mapping the temperature fields 20 as described above, it is possible to compute horizontal temperature gradients $\nabla T$ as indicated at 22 of FIG. 2A. It is also possible, by using the vertical temperature mapping to calculate the temperature lapse rate ∂T/∂z for use in calculation of the Richardson Number for computing the probability of clear air turbulence.

Figure 2G:
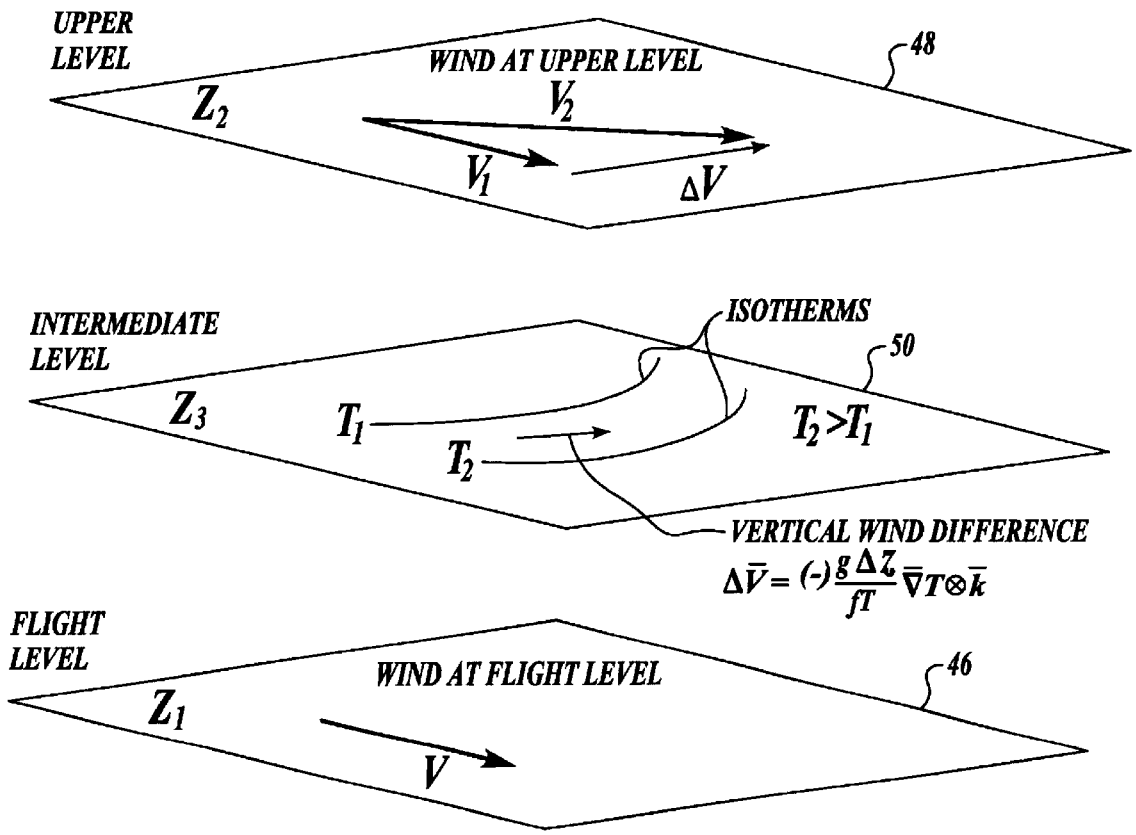
FIG. 2G is a pictorial representation of the determination of the direction and velocity of wind at a level above the flight level of the aircraft according to an embodiment of the present invention.

As is illustrated by the representation of FIG. 2G, one of the salient features of the invention is the capability of utilizing the temperature gradients computed at 22 to generate values representing vertical wind vector difference or horizontal winds at various flight levels. In this case, only a horizontal mapping at one level is needed. For example, a method according to the invention whereby the thermal wind concepts can be used to compute vertical wind vector difference, ΔV, as indicated at 24 of FIG. 2A, makes use of the following relation:

$$\Delta V = -\left[\frac{g \Delta z}{fT}\right] \nabla T \otimes k \quad (3)$$

where g is the acceleration due to gravity, Δz is the distance between $Z_1$ and $Z_2$, f is the Coriolis parameter resulting from the earth's rotation, T is the temperature at said flight altitude $Z_1$, ∇T is the vector representing the temperature gradient at the intermediate level $Z_3$ between $Z_1$ and $Z_2$, K is the unit vector parallel to the aircraft's local vertical and the symbol ⊗ represents the vector cross-product operator. In FIG. 2G, $Z_1$ denotes the current flight level of the aircraft, $Z_2$ denotes the flight level above the aircraft and $Z_3$ denotes the intermediate level. Equation 3 may be found in any standard meteorological text such as "Dynamical and Physical Meteorology," by G. J. flaltiner and F. L. Martin, (McGraw-Hill, N.Y., 1957) p. 204.

As a result, once the temperature gradients are computed 22 from the temperature field 20 the value of ΔV can be computed at 24 for the upper flight level 48 per equation (3). For an aircraft direction vector, $V_{ac}$, the vector dot product, $\Delta V \cdot V_{ac}$, is the increase in headwind or tailwind the aircraft would experience at the different altitude. In addition, the vector value ΔV can then be added to the vector value $V_1$ of the wind at the current flight level 46 to obtain a vector value $V_2$ which represents the direction and speed of the wind at the upper flight level 48. This value then can also be displayed on the display 26 in order to provide the air crew with information as to the wind at the upper flight level 48. Alternatively, the display 26 can be used to display just the difference in wind speed along the direction of the aircraft's flight at the upper flight level 48, for example by displaying a simple plus or minus sign along with a value representing the difference in velocity. In addition, the value of $V_2$ can be used as an input to the flight management system 28 so that factor can be used by the system 28 in determining the most efficient flight regime. Note that the temperatures are only needed in one horizontal plane to determine ∇T, and the wind difference, ΔV.

It will be understood that the above discussed method of determining wind direction and velocity $V_2$ at the upper flight level 48 would also apply to the determination of wind at a lower flight level below the current flight level 46. In this manner, it is possible to provide on the display 26 or to the flight management system 28 an indication of the winds both above and below the aircraft so that the crew can take advantage of this information in selecting the most fuel efficient altitude.

Another feature of the invention relates to the use of the temperature mapping function 20 along with the computation of vertical temperature gradients 22 to compute the probability of clear air turbulence 30. In particular, the vertical temperature mapping 20 can be used to calculate the lapse rate ∂T/∂z for determination of the Richardson number Ri which is correlated with turbulent conditions. In this case Ri is computed using the following relations:

$$Ri = \left(\frac{g}{\theta}\right) \frac{\left(\frac{\partial \theta}{\partial z}\right)}{\left|\frac{\partial V}{\partial z}\right|^2} \quad (4)$$

where $$\theta = T\left\{\frac{1000}{p}\right\}^{\frac{R}{C_p}} \quad (5)$$

and where θ is the potential temperature, ∂θ/∂z is the vertical gradient of the potential temperature, ∂V/∂z is the vertical wind shear, g is acceleration due to gravity, V is the horizontal wind vector, z is height, T is temperature in Kelvin, p is atmospheric pressure in millibars, R is the universal gas constant and $C_p$ is the specific heat of air at constant pressure. The Richardson number, Ri, is a measure of the probability of CAT. For Ri below 0.21, atmospheric turbulence occurs and CAT is likely. Severity of CAT increases with decreasing Ri. Referring again to FIG. 2A, the probability of clear air turbulence is determined at 30 with the result displayed on the CAT display 32.

The embodiment of the invention in FIG. 2A has been described in connection with an aircraft traversing temperature fields in its flight path. However, this type of apparatus can also adapted for use in mapping temperature fields from a fixed geographical position. By using the radiometer 12 at a fixed site to scan temperature at the effective range $R_{eff}$ as described above over a period of time as the weather moves over the radiometer, it is possible to generate a map of the temperature fields for a wide area. The temperature map can then be used for warnings of wind conditions such as clear air turbulence and dry microburst conditions. Another use at a fixed position is to scan the temperature field in 360° azimuth and in elevation to determine wind differences, or CAT at one time.

RADAR SENSING

The present invention may also incorporate the existing and/or a dedicated aircraft radar sensor to scan for significant weather such as CAT ahead of the aircraft. Management of the existing weather radar scans to search for CAT type conditions are preferably interleaved with the scans normally conducted by the weather radar during routine weather scans. U.S. Pat. No. 5,831,570, incorporated by reference, describes one possible interleaving technique. Other techniques are possible.

In another embodiment of the invention, the radar sensor, which may be an HF, VHF or ionosonder-like device senses atmospheric ionization resulting from CAT and/or windshear events. Friction between moving air masses results in ionization that causes localized changes in the maximum radio frequency that will propagate in that region. This property can be used to sense versions of clear air turbulence even in dry air.

The data from the aircraft radar sensor can be utilized as observational data to refine coarse simulation data utilizing the nested grid algorithm or to refine turbulence forecasts to provide a CAT nowcast. Further, coarse simulation data can be utilized to determine areas of high CAT probability and to direct the radar to preferably scan those areas.

Tilt Control

To maximize the number and types of data scans the radar can make, automation of the radar scan or tilt controls are desirable. This automation reduces pilot workload and better enables the radar to perform multiple tasks.

Figure 3A:
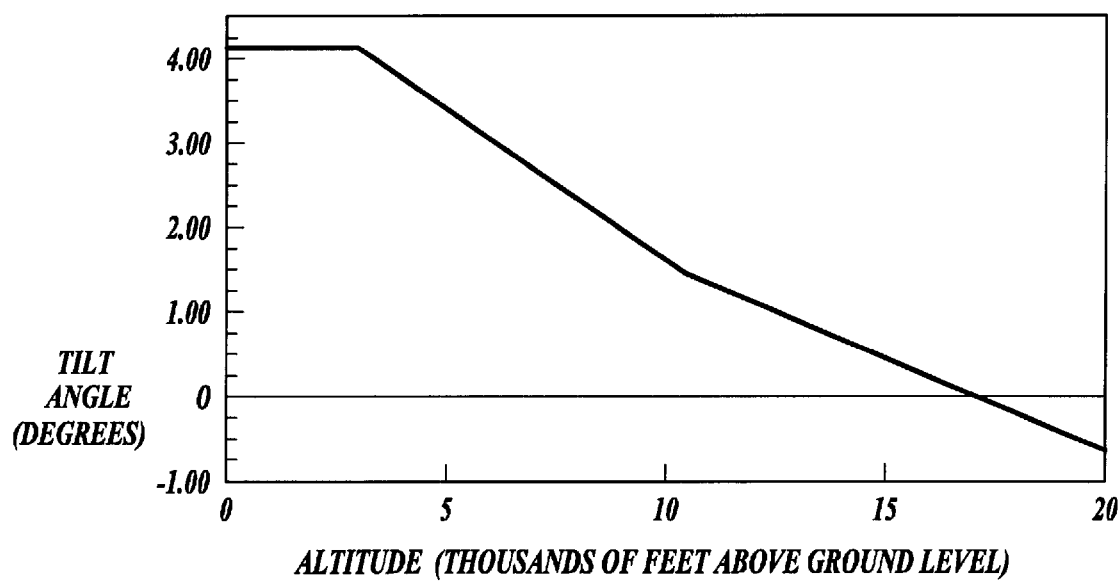
FIG. 3A shows tilt angle as a function of altitude for take-off and landing.

An automated scan management and tilt control may be provided in any one of a number of ways. In one embodiment of the invention, the radar may utilize a predetermined schedule of tilt angles according to height above ground and flight phase as depicted in FIG. 3A.

Figure 3B:
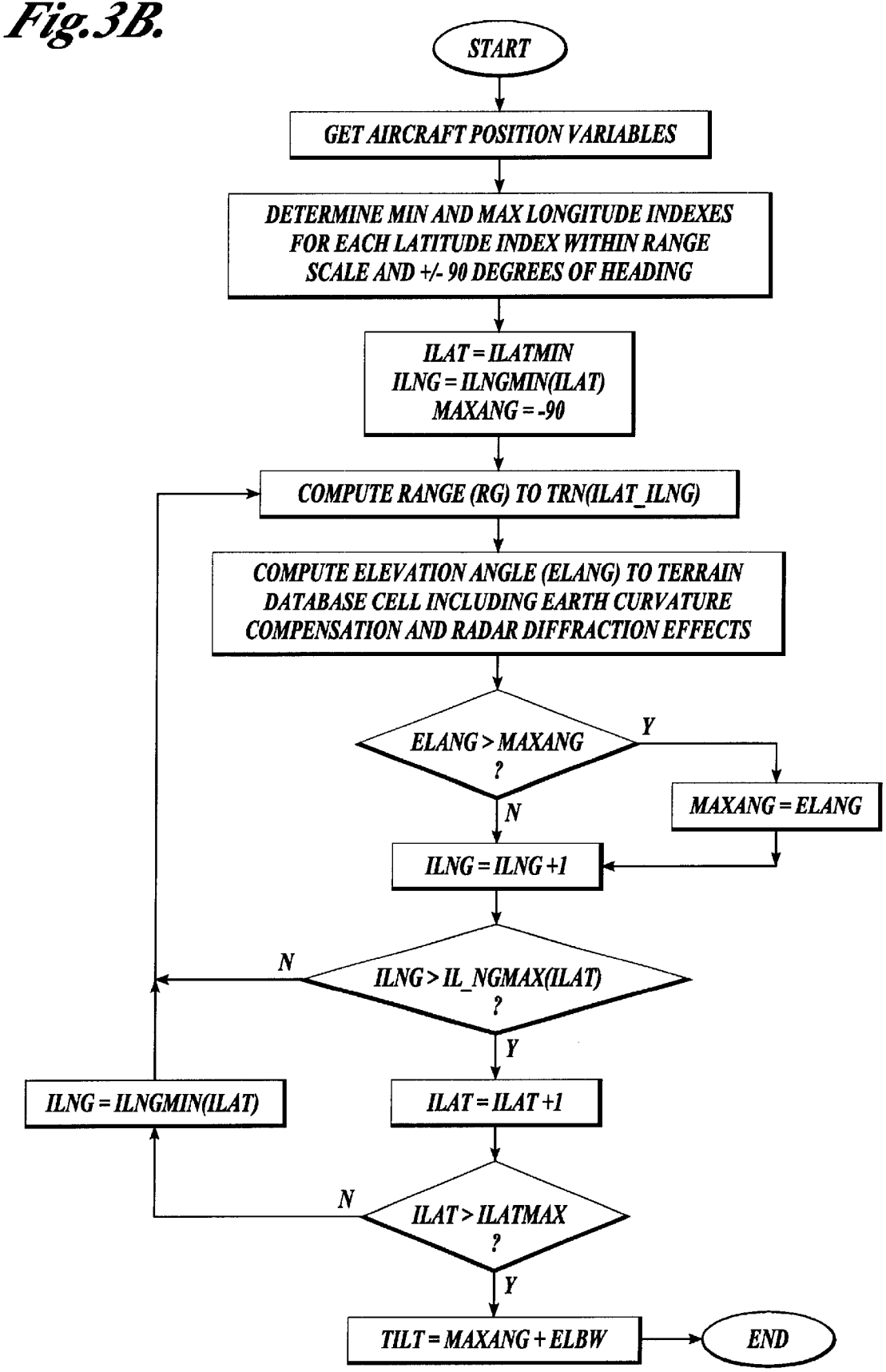
FIG. 3B is a flow chart of a tilt angle schedule.

According to another embodiment of the present invention, a terrain database is used to automatically calculate the tilt angle. One such database is included in the Enhanced Ground Proximity Warning System (EGPWS) manufactured by Honeywell International, Incorporated. Other databases may be used. This embodiment of the invention utilizes the inputs described below. FIG. 3B describes a tilt angle schedule using these inputs to one embodiment of the invention.

Inputs
1. aircraft altitude for example, relative to sea level [alt]
2. aircraft position for example, in latitude [lat]
3. aircraft position for example, in longitude [lng]
4. terrain database [trn (ilat, ilng)] where ilat represents the latitude index and ilng represents the longitude index
5. radar range scale in for example, nautical miles (10, 20, 40, 80, 160, 320) [RS]
6. database cell size in for example, nautical miles (0.25, 0.5, 1.0, 2.0, 4.0) [CS]
7. half-power elevation beam width of the weather radar for example, in degrees (i.e., the angular distance from the main antenna axis—measured in the vertical plane containing the main antenna axis—at which the signal strength falls to half the maximum value) [elbw]
8. aircraft heading relative to north (where positive is clockwise from north) [hdg]

The schedule of FIG. 3B first determines the values of the aircraft position variables. Then, for each latitude index within the radar range scale and within 90 degrees of the aircraft heading, the minimum and maximum longitude indices within those same limits are determined. The latitude index is then set to the minimum latitude index within the range scale and within 90 degrees of the aircraft heading and the longitude index is set to the minimum longitude index within the range scale and within 90 degrees of the aircraft heading and intersecting the latitude index. A maximum angle variable (MaxAng) is created and set to negative 90 degrees. The schedule of FIG. 3B then computes the distance between the aircraft and the terrain database point that corresponds to the latitude and longitude indices.

Compensating for earth curvature and radar diffraction according to techniques known to those of skill in the art, the elevation angle between the aircraft and the terrain database cell (ElAng) is measured and compared to the maximum angle variable. If the elevation angle is greater than the maximum angle, the maximum angle is set equal to the elevation angle. If the elevation angle is not greater than the maximum angle, the longitude index is increased by one. The longitude index is then compared to the maximum longitude index within the range scale and within 90 degrees of the aircraft heading and intersecting the latitude index. If the longitude index is not greater than the maximum longitude index, then the algorithm loops back to the computation of the distance between the aircraft and the terrain database point that corresponds to the latitude and longitude indices. If the longitude index is greater than the maximum longitude index, then the latitude index is increased by one. The latitude index is then compared to the maximum latitude index within the range scale and within 90 degrees of the aircraft heading. If the latitude index is not greater than the maximum latitude index, then longitude index is set equal to the minimum longitude index within the range scale and within 90 degrees of the aircraft heading and intersecting the latitude index and the method loops back to the computation of the distance between the aircraft and the terrain database point that corresponds to the latitude and longitude indices. If the latitude index is greater than the maximum latitude index, then the tilt angle is calculated by adding the maximum angle to the half-power elevation beam width of the weather radar.

The weather radar's antenna tilt angle maybe recomputed each time the aircraft moves outside of a database cell, changes range scale or makes a change in aircraft heading.

WEATHER UPLINKING AND DISPLAY

According to one embodiment of the present invention, the invention includes a display 32 (FIG. 2A) for displaying the CAT information to the pilot. Display 32 may be a dedicated display but may also be a display shared with other functions, such as for example, weather radar, EFIS, FMS, EGPWS or any other aircraft display. In a preferred embodiment of the invention, a tactical display of weather data that includes CAT information may be displayed to the pilot. This display may optimally include weather and/or CAT data uplinked to the aircraft. The external data source may include ACARS, HF radio linked and other sources of data linking know to those of skill in the art.

In an alternate data architecture, a first aircraft collects local atmospheric data, in situ accelerations and other flight data as a function of aircraft position and altitude which is down-linked to a ground station. The ground station may also receive weather data from other ground based sources, satellite links, weather balloons and other weather gathering sources known to those of skill in the art. The down-linked information is used to assemble weather products based on, for example, National Center of Atmospheric Research models, and displayed in the ground station. According to one aspect of the invention, the invention provides multiple weather products, for example, turbulence, position, altitude, winds, temperature, severe cells from weather radar returns and other products. The ground station up-links the weather products, for example, position, speed and track, and magnitude of significant weather to the originating aircraft and other aircraft. The weather products are received, displayed and stored until the next up-link is received.

The weather products up-linked, displayed and stored include, but are not limited to, significant weather. At the pilot's discretion and for tactical use, weather areas and in particular significant hazardous weather areas are displayed on a cockpit display. According to one embodiment of the invention, the pilot may manually select between display of the weather products information and the display of other information such as, for example, terrain, weather radar or EFIS map.

Figure 4A:
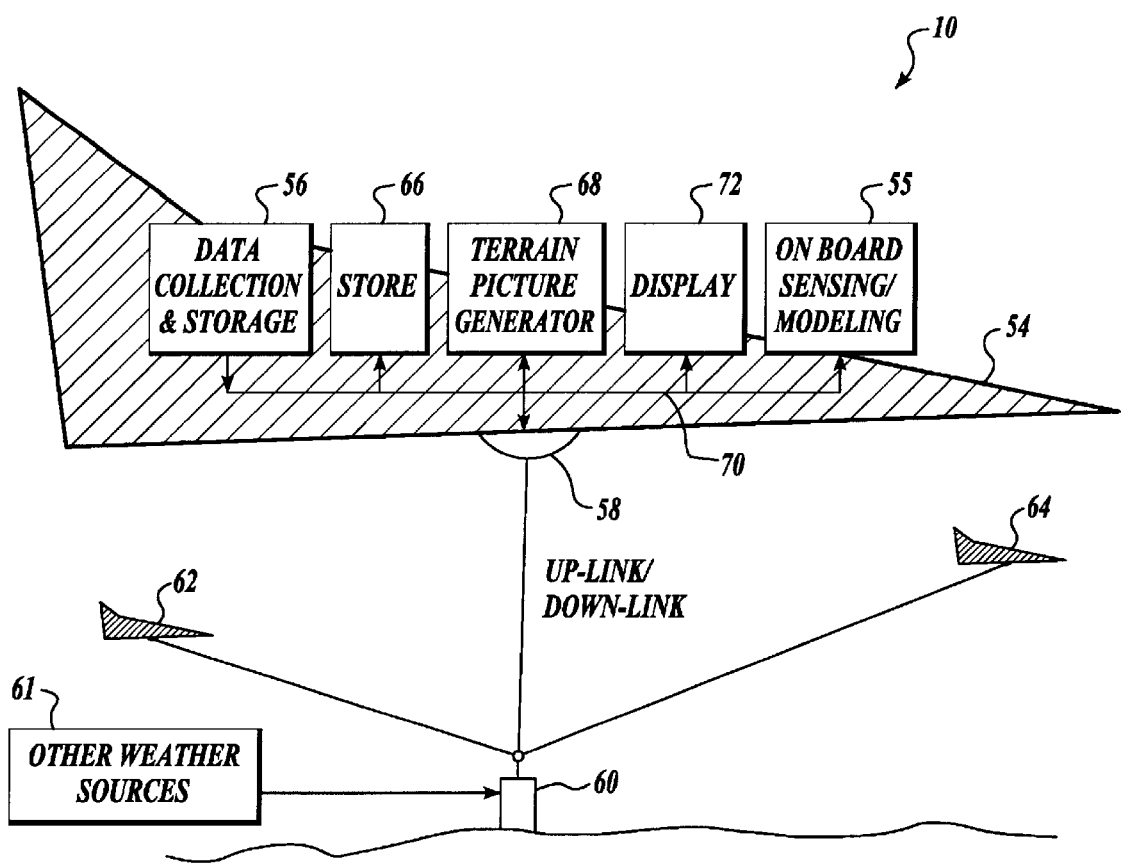
FIG. 4A illustrates a weather uplink and display architecture according to one embodiment of the present invention.

FIG. 4A diagrams one possible data collection, up-link/down-link, weather product storage and display in an embodiment where aircraft also down-link information. In a preferred embodiment, the invention predominantly uses existing equipment. For example, in aircraft weather information system 10 shown in FIG. 4A, an aircraft 54 collects current local atmospheric data, in situ accelerations and other flight data as a function of aircraft position and altitude using existing onboard data sources 55, for example, onboard navigation data, altitude data, atmospheric data, sensor data and weather radar return data. The invention stores the data in a memory storage location 56. The data is down-linked via an antenna 58 to a ground station 60 where the data is used to assemble and refine weather products in conjunction with other available weather data 61. The weather products are up-linked to originating aircraft 54 and other aircraft 62, 64. The weather products are received and stored in a memory location 66 and converted to visual depictions using a picture generator 68, for example, an existing ground proximity terrain picture and symbol generator. The video data is transmitted via the existing weather video bus interface 70 and displayed on one or more existing cockpit color display devices 72, for example, an EFIS map and/or a weather radar display. Thus, it is possible to operate independently of the aircraft system level data bus and symbol generators.

In a preferred embodiment of the invention, icon images depicting and bounding significant hazardous weather are shown on existing color displays found in the cockpit. Each icon uniquely depicts a specific significant weather hazard area, for example, convective hazard areas, potential turbulence areas, winter precipitation areas or icing areas. According to one preferred embodiment of the invention, significant weather is displayed to a minimum range of 320 nautical miles along the aircraft's flight path. According to another preferred embodiment of the invention, significant weather is displayed to a minimum range of 640 nautical miles along the aircraft's flight path.

Figure 4B:
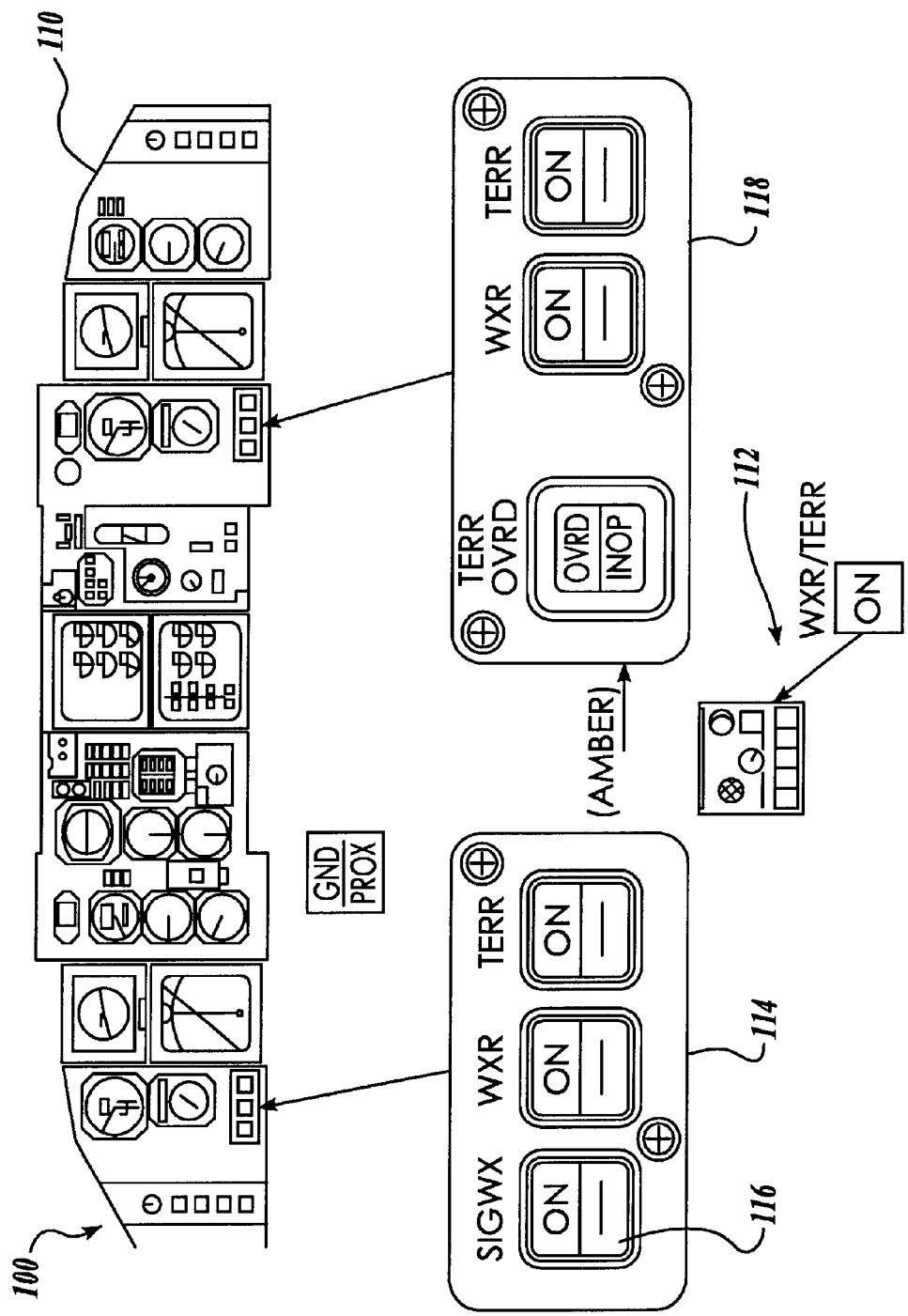
FIG. 4B illustrates a typical cockpit display installation according to one embodiment of the present invention.

FIG. 4B illustrates a typical cockpit installation 100. The particular cockpit installation depicted in FIG. 4B is a retrofit installation wherein an aircraft instrument panel 10 includes a ground proximity warning system accessed by weather radar/terrain switch 112. The pilot's ground proximity warning system switch panel 114 is modified to incorporate a on/off switch 116 whereby the pilot accesses the significant weather data upon command. Instrument panel 110 includes ground proximity warning system switch panel 118.

Weather radar video data bus 70 is, for example, a video data bus compliant with Aeronautical Radio, Incorporated (ARINC) standard 453, which incorporates a limited palette of colors and has limited bandwidth capabilities.

Implementation of the invention using other video data buses is possible, however, and the invention itself is not so limited.

The icons displayed in one possible embodiment include a variety of polygons unique to a specific significant weather hazard, for example, convective hazard areas, potential turbulence areas, winter precipitation areas or icing areas. In one implementation, the icons are two-dimensional (2D) images indicating the weather hazard's geographic location relative to the aircraft. According to another embodiment of the invention, the icons are three-dimensional (3D) images indicating the weather hazard's altitude relation to the aircraft in addition to the weather hazard's relative geographic location.

Figure 4C:
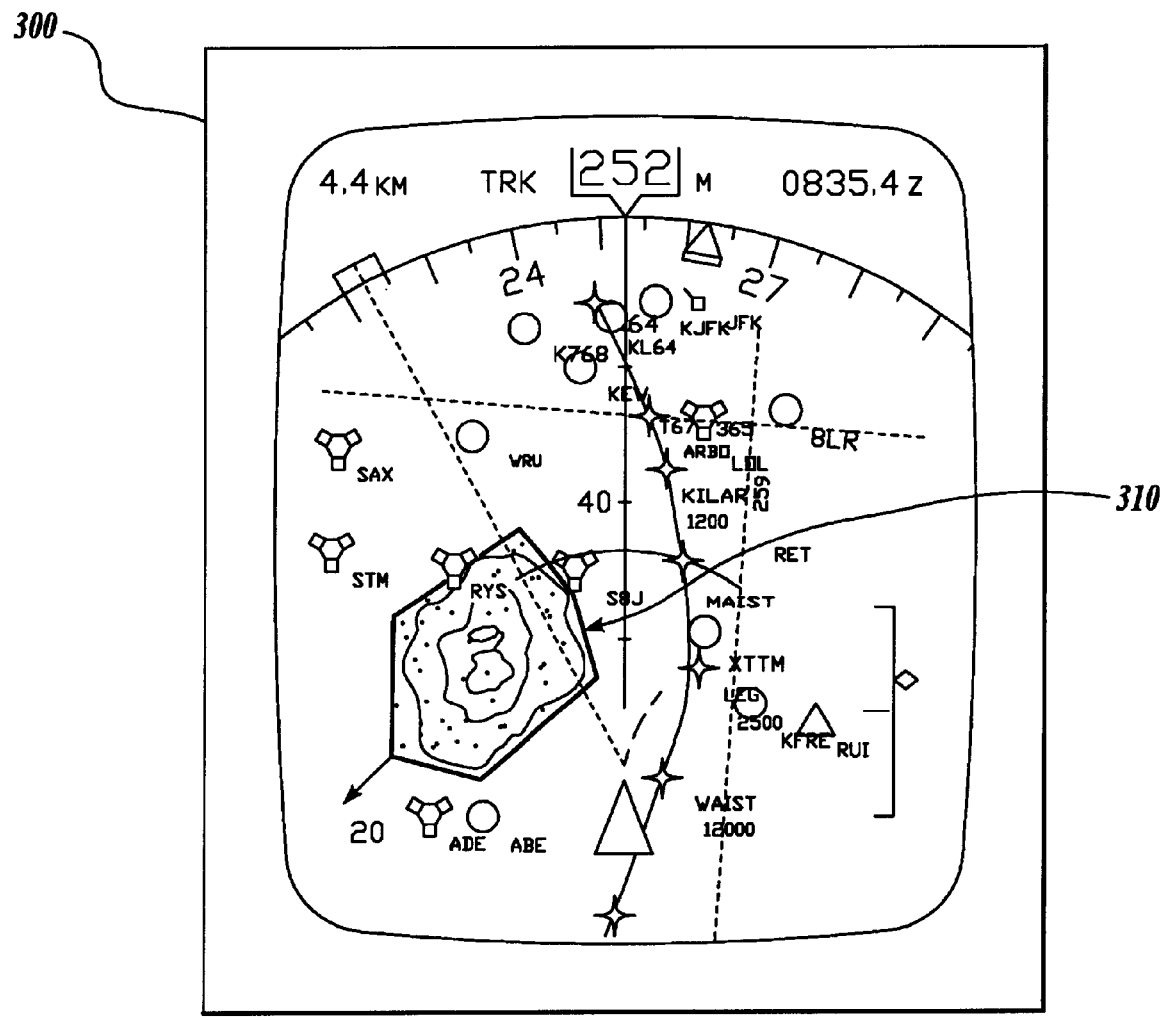
FIGS. 4C and 4D show examples of weather polygons according to one embodiment of the present invention.
Figure 4D:
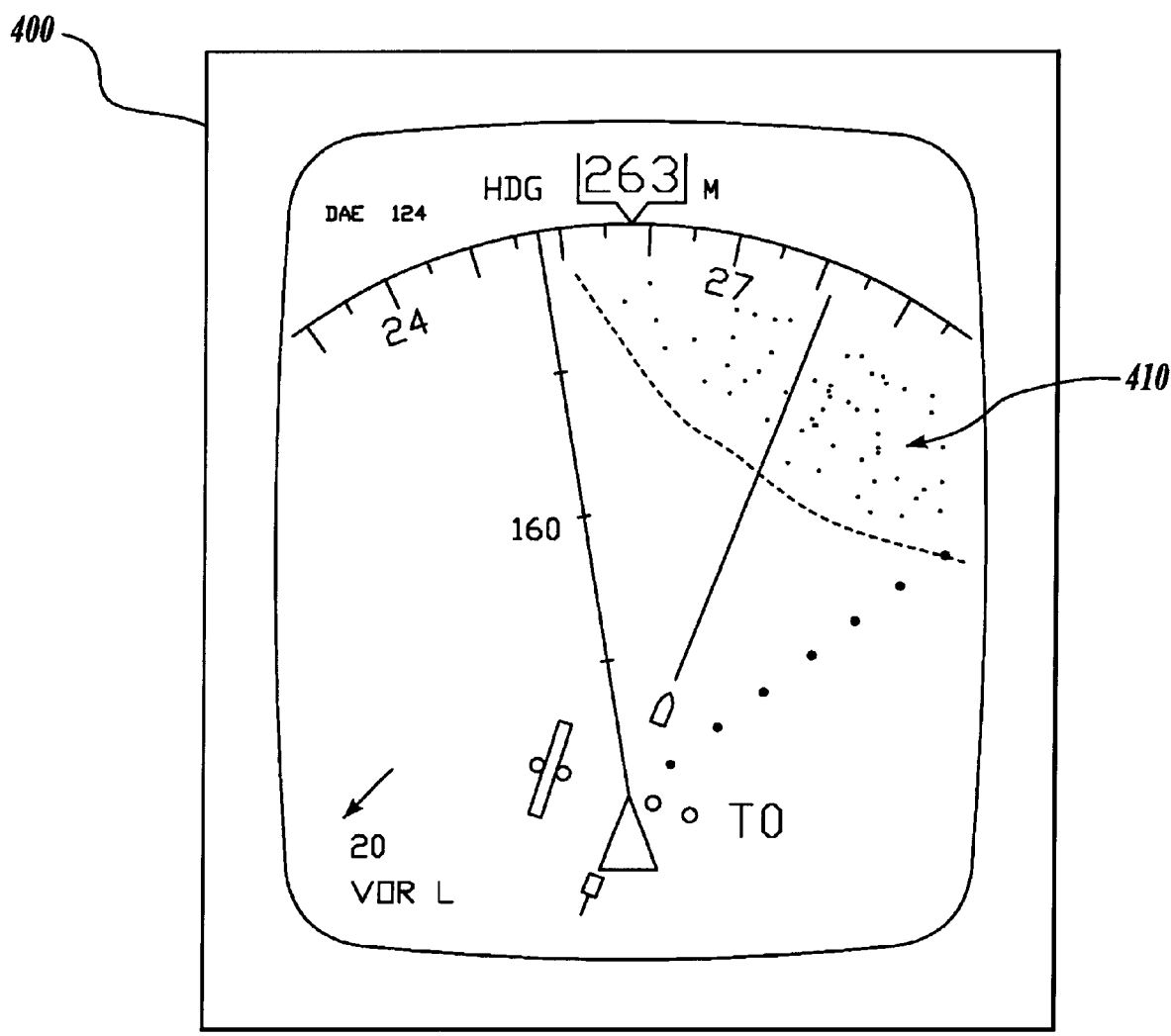
Figure 4E:
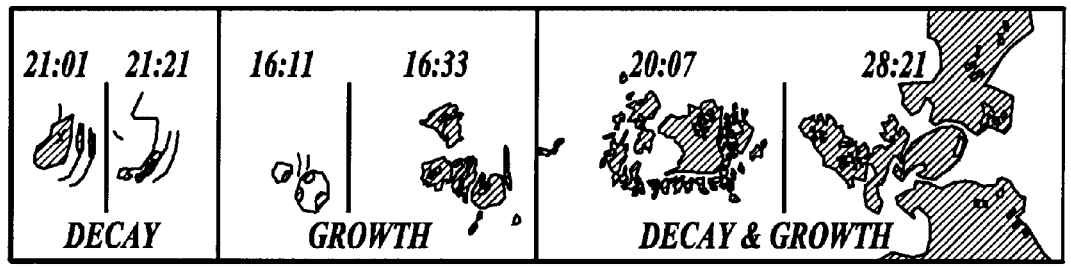
FIG. 4E illustrates a weather product.
Figure 4F:
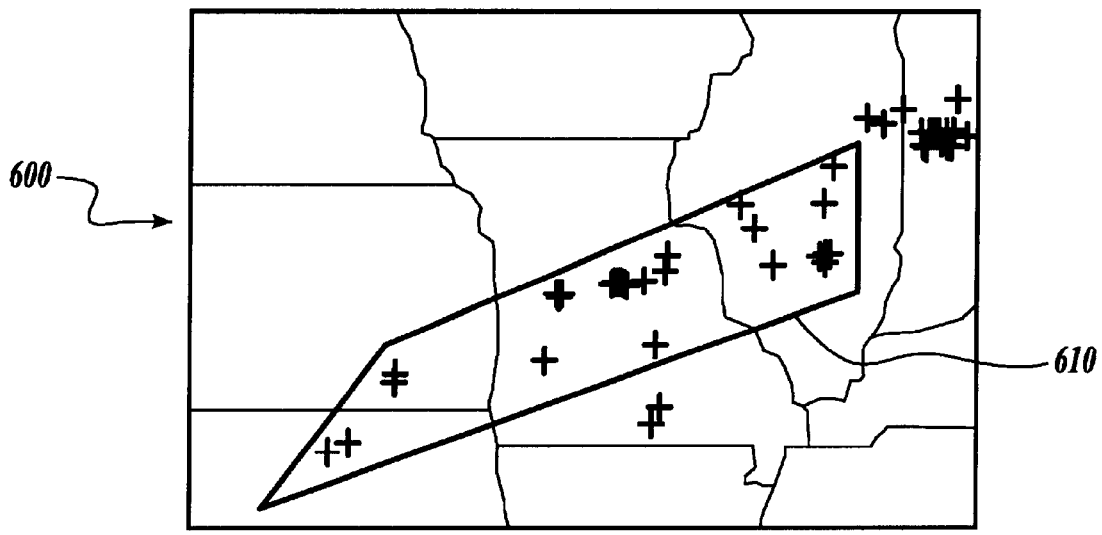
FIG. 4F illustrates another weather product, including an example of a weather polygon according to one embodiment of the present invention.
Figure 5A:
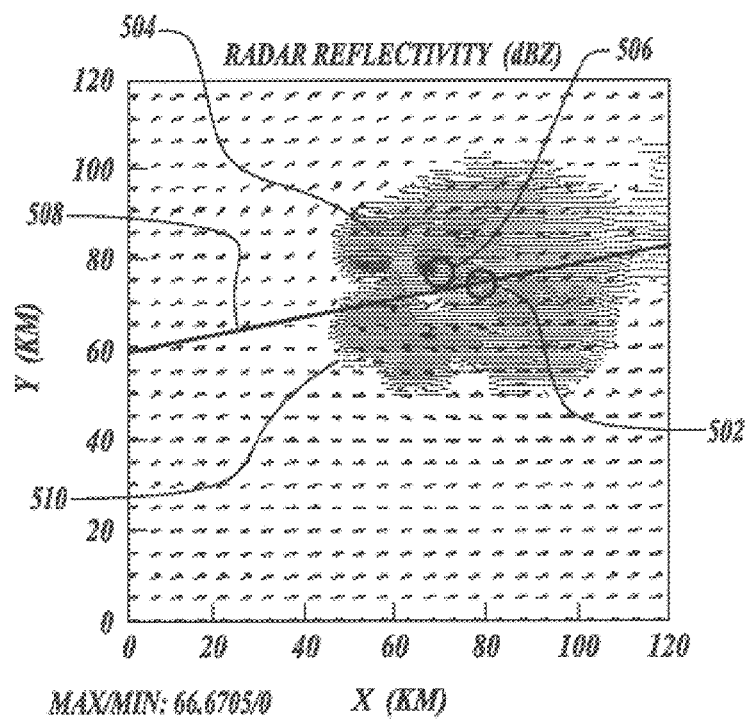
FIGS. 5A through 5F show plots of several storm-related variables and radar reflectivity for a multicell storm aged 80 minutes taken at an altitude of 10 km.
Figure 5B:
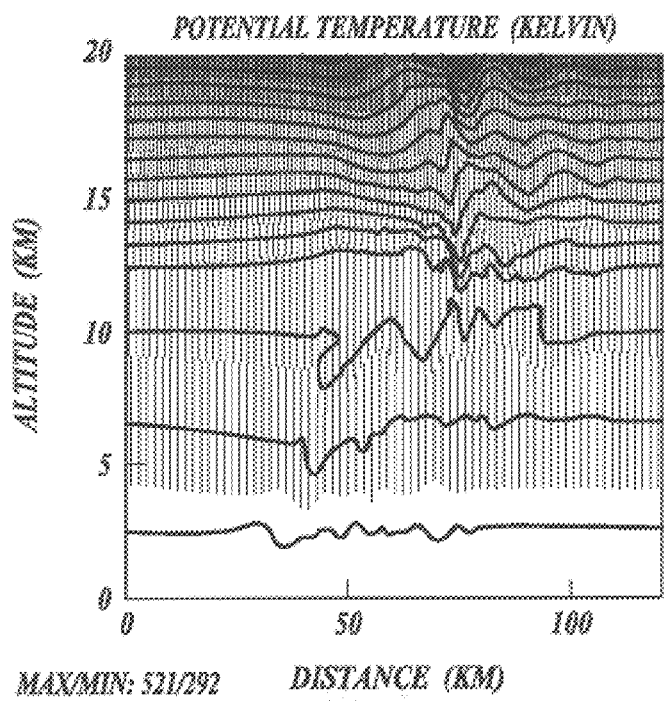
Figure 5C:
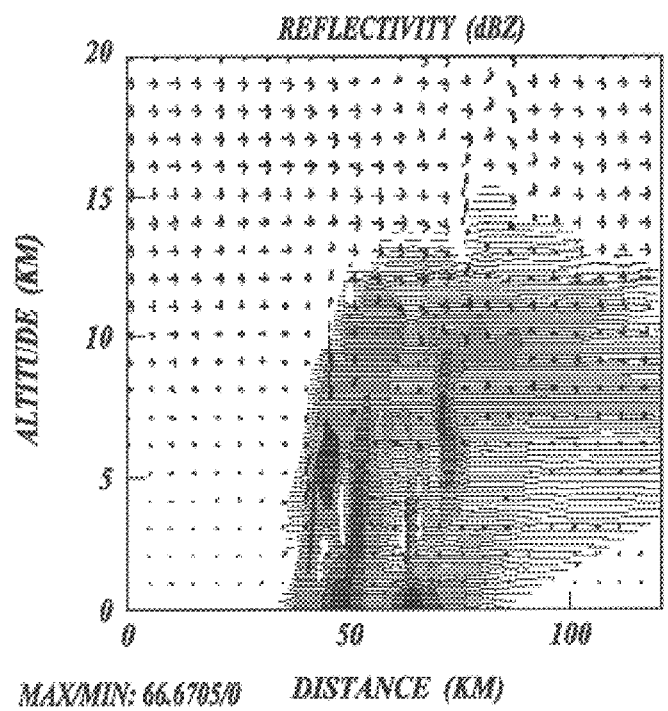
Figure 5D:
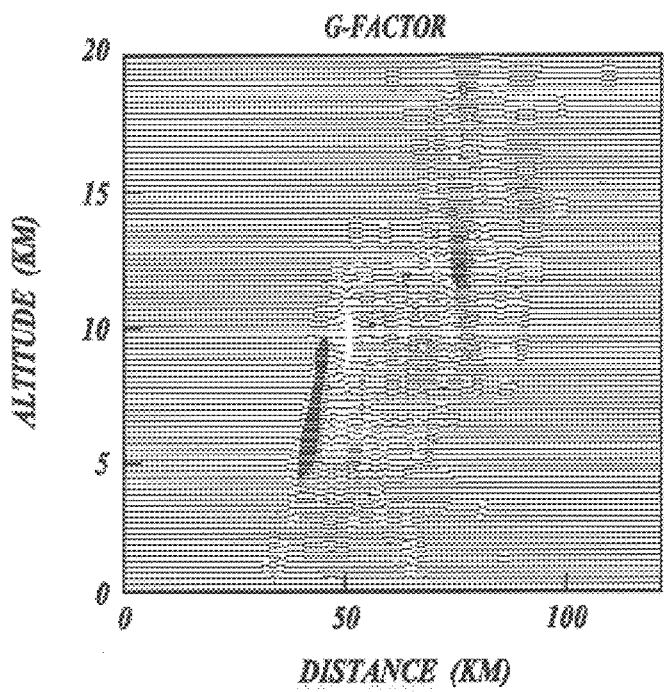
Figure 5E:
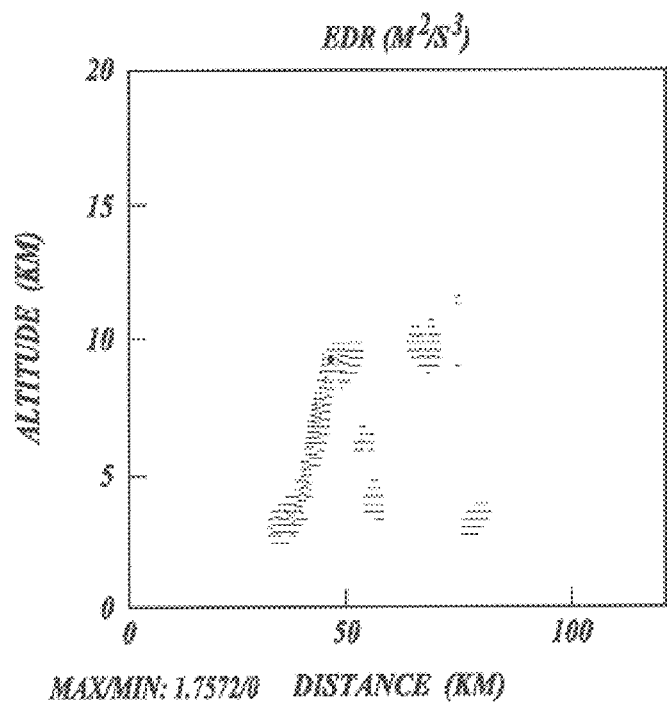
Figure 5F:
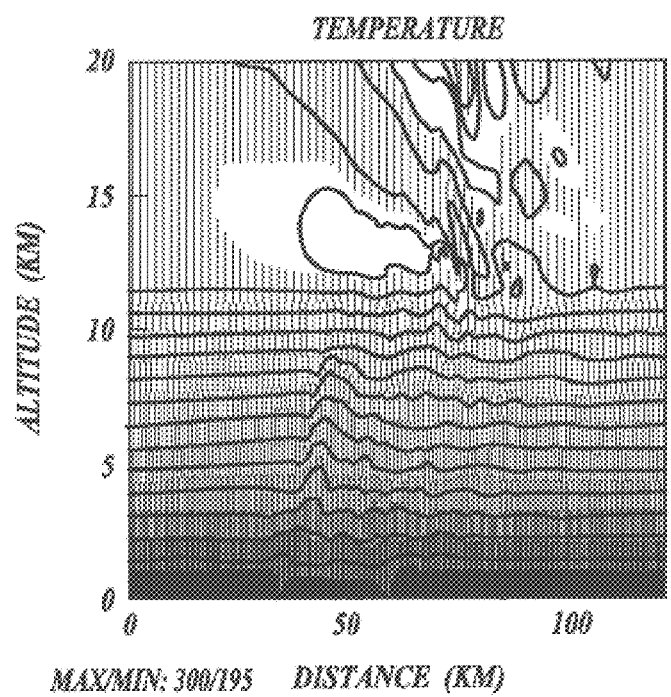
Figure 6A:
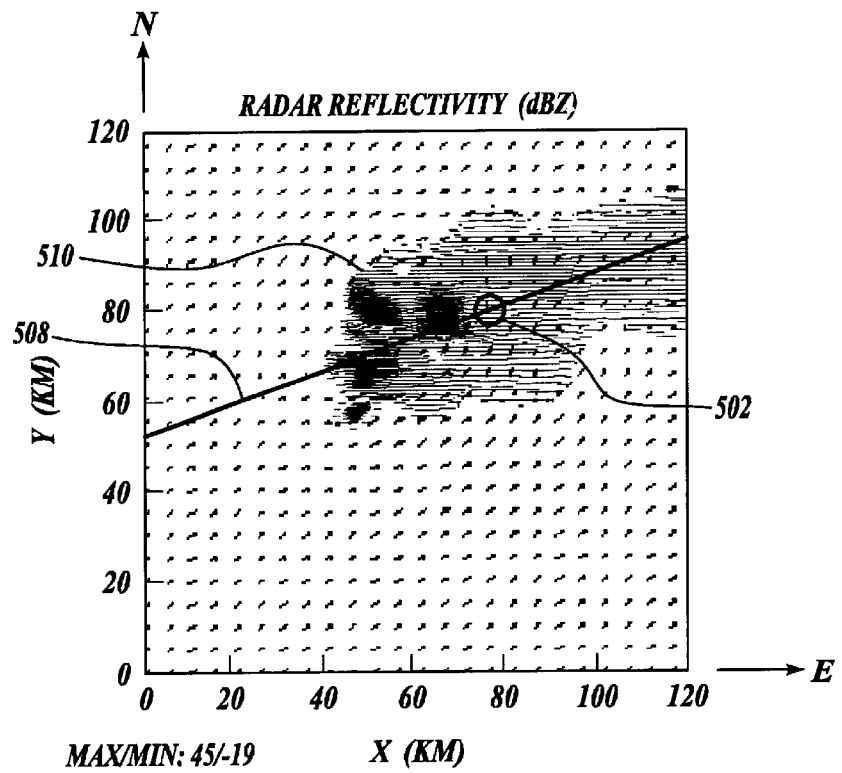
FIGS. 6A through 6F show plots of several storm-related variables and radar reflectivity for a multicell storm aged 80 minutes taken at an altitude of 6 km.
Figure 6B:
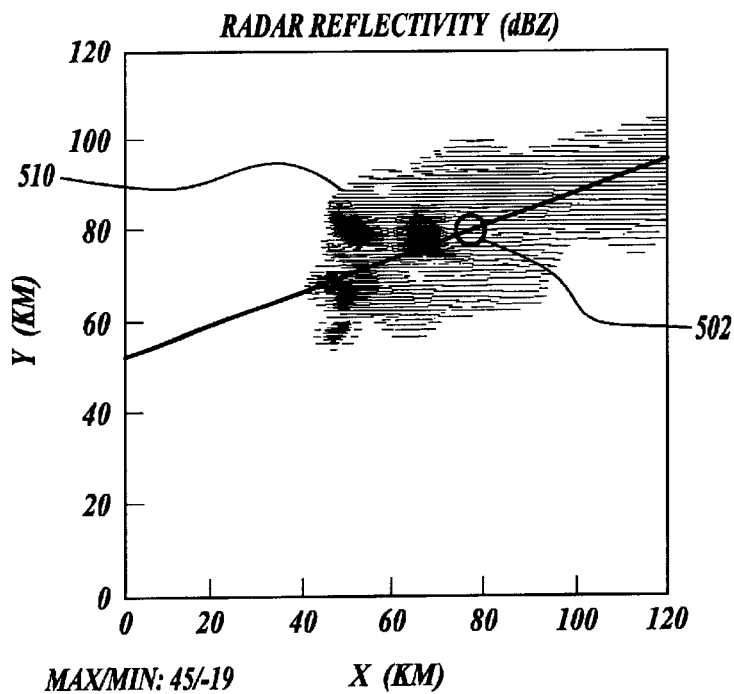
Figure 6C:
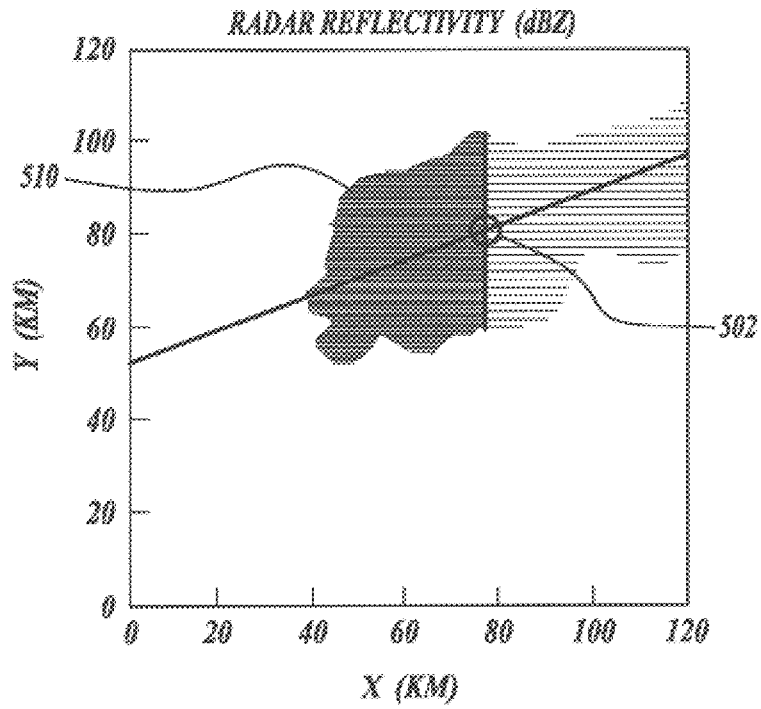
Figure 6D:
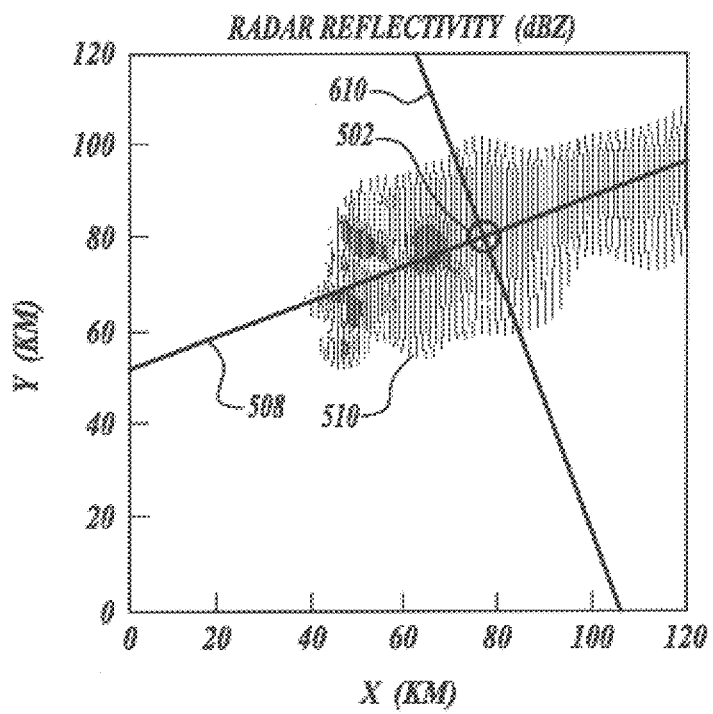
Figure 6E:
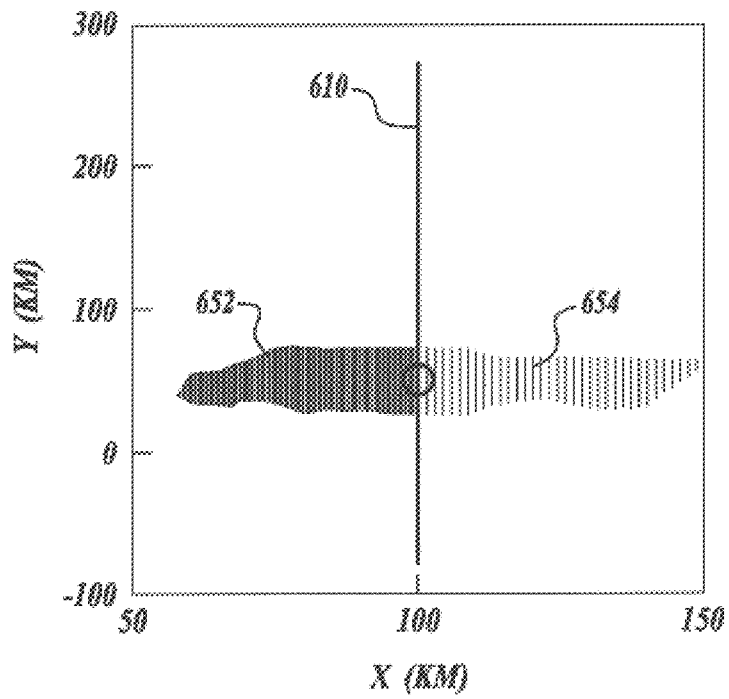
Figure 6F:
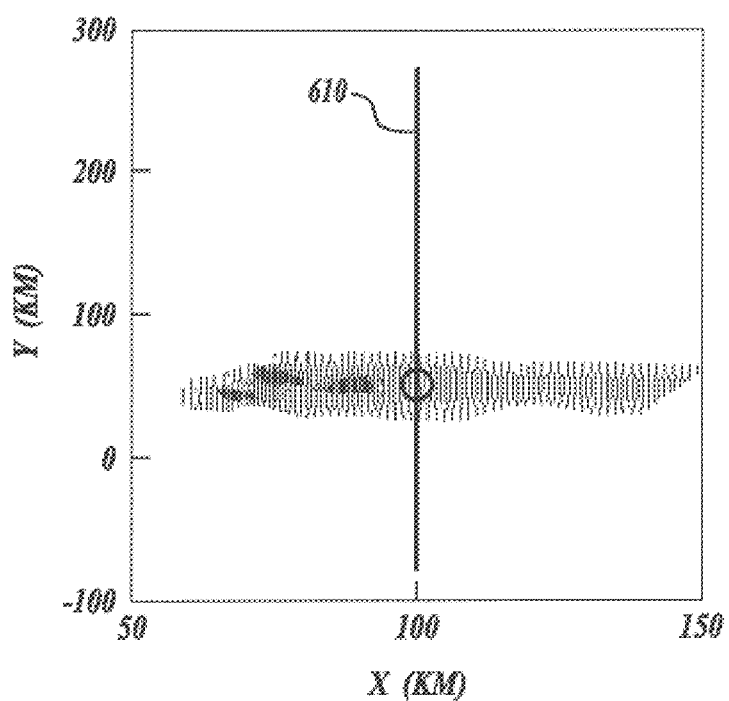
Figure 7A:
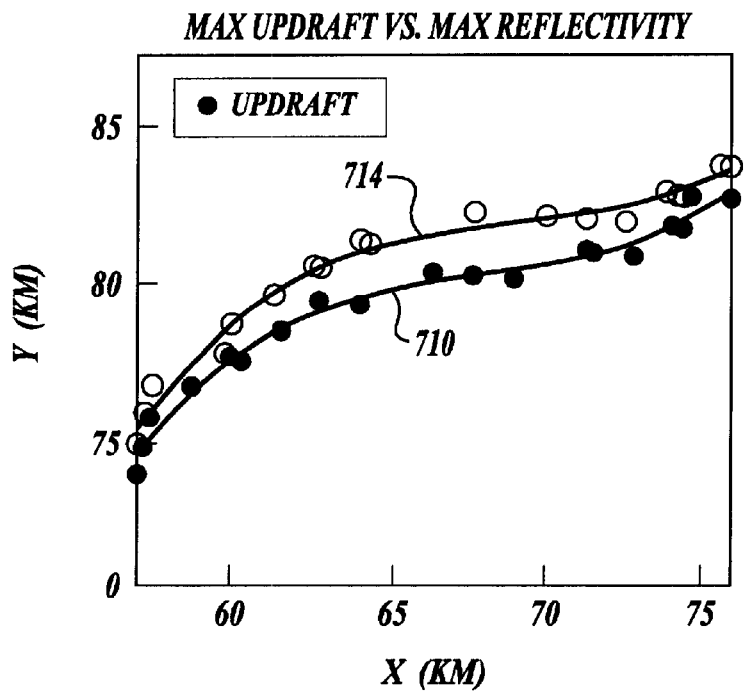
FIGS. 7A through 7D illustrate the use of radar reflectivity to track the movement of a convective storm during its development, which allows pilots to avoid the most severe parts of the storm.
Figure 7B:
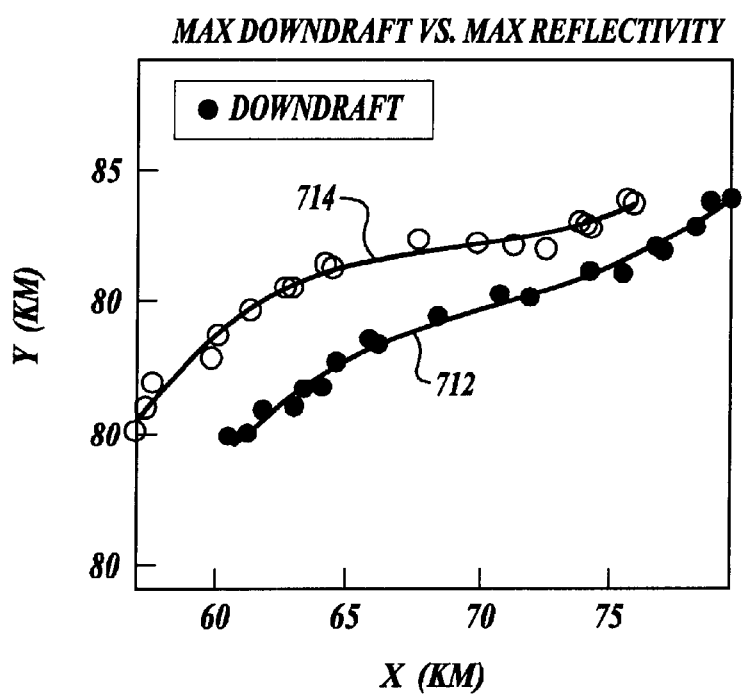
Figure 7C:
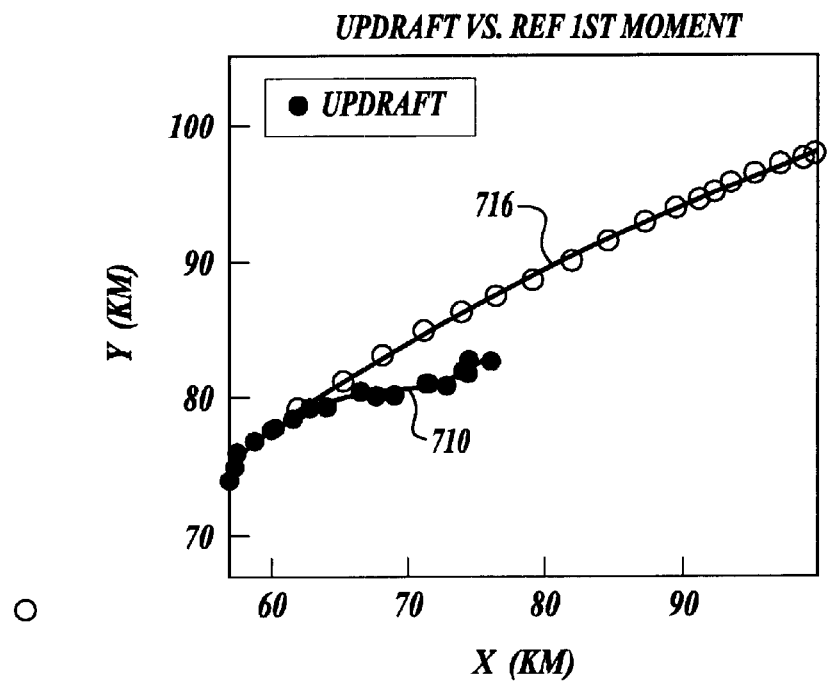
Figure 7D:
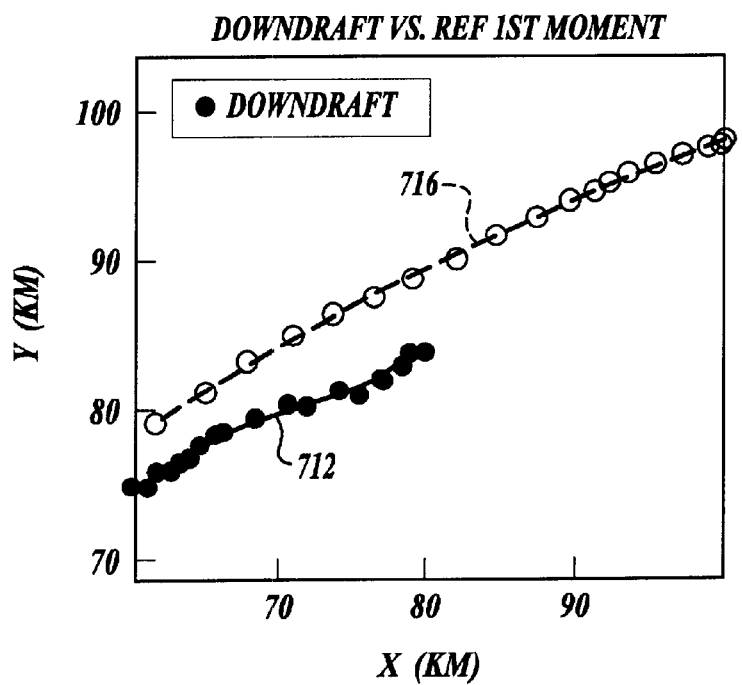

FIGS. 4C and 4D show examples of weather polygons according to the. FIG. 4C illustrates a cockpit display 300 selected to display data within an eighty nautical mile range of the aircraft. FIG. 4C includes an example of a 2D polygon-shaped image 310 depicting a predicted hazardous convectivity activity area. According to the invention, polygon-shaped image 310 is displayed in color, for example, polygon-shaped image 310 is displayed as a red polygon shape with red color dots. According to one preferred embodiment, the weather radar returns of cells lying within the hazardous convectivity activity area are displayed inside polygon-shaped image 310.

FIG. 4D illustrates another cockpit display 400 according to one embodiment of the invention selected to display data within a three hundred twenty nautical mile range. FIG. 4D includes an example of a unique 2D polygon-shaped image 410 depicting a predicted turbulence area. According to the invention, polygon-shaped image 410 is displayed in color, for example, polygon-shaped image 410 is displayed as a yellow polygon shape with yellow color dots.

Onboard Radar System and Scan Interleaving

An onboard radar system and techniques for scan interleaving suitable for use an onboard sensor to provide observational data in the preferred embodiments is disclosed in U.S. Pat. No. 5,831,570, assigned to the assignee of the present application, and is hereby incorporated by reference for all purposes.

The invention has now been described with reference to the preferred embodiments. Alternatives and substitutions will be apparent to persons of skill in the art. In particular, the algorithms and services for providing simulation data are exemplary only and not critical to practicing the invention. Alternatives will be known to persons of skill in the art and substitutes will continually be developed. Further, additional onboard sensors and off-boar sources of observational data will continually be developed. The particular type of sensor or data source is not critical to practicing the invention. Accordingly, it is not intended to limit the invention.

ADDITIONAL EMBODIMENT

According to the present invention, a "storm data bank" of storm morphology and development over time is developed through numerical modeling. This includes generating a storm bank of various storm scenarios, including squall line storms and data simulating NTSB accidents. The data are analyzed to determine basic variations and combinations of storm attributes. Predetermined diagnostic parameters: pattern, extent, intensity, maturity, and motion direction of storm, are applied to analyze the power returns of an onboard whether radar, which provide spatial and temporal data about the storm. A correlation algorithm calculates a Turbulence Index as a function of the radar return data. A nowcast of convection induced turbulence ahead of the aircraft is generated as a function of the Turbulence Index. Audio and/or visual alerts are generated as appropriate.

Develop "Storm Data Bank" of Storm Morphology

Convection induced turbulence or CIT is the eddies and currents surrounding a storm. Updrafts and downdrafts within the wet air of the storm create these eddies and currents, which can extend for as much 10 to 20 km above the wet air of the storm. As mentioned above, this turbulence is invisible to radar. According to the invention, computer models of storms scenarios, including detailed studies of the air velocities within the storm, provide descriptions of the convection induced turbulence above the storm. In a preferred embodiment, a set of typical storm scenarios are generated through meteorological modeling to form a "storm data bank." The storm data bank preferably contains most storm features encountered by aircraft.

These weather scenarios representing major storm scenarios are preferably generated using meteorological data in one of the well-known numerical simulation models, such as the Advanced Regional Prediction System (ARPS) model. Time influences the predicted CIT because the storm's characteristics change as it develops and ages. Therefore, the storm data bank includes the storm development and morphology over the life time of the storm. In a preferred embodiment, the scenario data are generated through numerical modeling using meteorological data. The storm scenarios include short-lived airmass or "single cell" thunderstorms; strong, sustained supercell thunderstorms; continuously developing multicell thunderstorms, and squall line systems. Most storms generating the CIT of interest last about 2 hours or less. Supercell thunderstorms are single, quasi-steady storms that persist for more than 2 hours. They consist of a strong, single updraft/downdraft pair that create a strong, sustained, upper level shear, the updraft often having a velocity of more than 50 m/s, and the downdraft having velocities of 30–40 km. The updraft region is coincident with an area of little precipitation surrounded by area of strong precipitation that wraps around this center in a rotating storm and creates the hook-echo region seen in radar reflectivity. The vertical extent of a supercell storm is up to 12 km, while the horizontal extent is in the range of 15–25 km. A large anvil region develops at tropopause level as air parcels lose their buoyancy and fan out being carried downstream by the prevailing wind at this level. As winds interact with the storm, there is a wake of turbulence downstream, which can extend beyond the area defined by the storm itself. Multicell thunderstorms develop a weaker shear than the supercell. Airmass or single-cell thunderstorms on the other hand are short lived and create no windshear. Hybrid thunderstorms are any combination of the single-cell, multi-cell and supercell thunderstorms. Additional cases simulating NTSB accidents are included in the storm data bank. Thus, the scenario data preferably contain most storm features encountered by aircraft.

Correlate Turbulence With Storm Morphology

Relationships between turbulence and the spatial and temporal properties of radar reflectivities are determined using these scenario data. The precipitations associated with CIT provide an opportunity to exploit the use of weather radar as a source of information for turbulence nowcast. According to the present invention, the precipitations associated with CIT are detected by the host aircraft s weather radar unit to provide a source of information for generating a turbulence nowcast. Radar returns provide spatial and temporal information about convective storms. They can be analyzed to produce diagnostic turbulence variables, such as the pattern, the extent, and the intensity of the storm. They can also provide information about the maturity and the moving direction of the storm. Table 1 in the Appendix lists convective storms simulated using ARPS model and used to develop the storms in the storm data bank. Table 2 in the Appendix lists output variables from the ARPS model and their names under GRIB (GRidded Binary) data format, a general purpose, bit-oriented data exchange format useful for transmitting and storing large volumes of gridded data. Formulas used to calculate derived variables are as shown in Appendix.

A series of high level computation programs, for example, Matlab® programs, are used to process and visualize the simulated data. Two-dimensional cross-sectional graphics are used to visualize various properties of the data. Plots are made of radar reflectivity of the supercell storm at various altitudes at predetermined time intervals from the start of the storm generation through the two hour life expectancy of the storm, or in the case of a supercell storm, optionally through the entire life of the storm. For example, plots were made of radar reflectivity of the supercell storm at an altitude of 6 km at five minute time intervals from the start of the storm generation, i.e., during time series of 0, 5, 10, 15, . . . through 120 minutes. Additional plots were made of the same storm at an altitude of 10 km during the same time series from the start of the storm generation through 120 minutes. Similarly, plots were made of radar reflectivity of the multicell storm at an altitude 6 km and 10 km, respectively, during the same time series from the start of the storm generation through 120 minutes. The data from the plots show that during the evolution of the storm, radar reflectivity develops the storm's specific pattern, i.e., the storm is stretched longer in one direction due to an interaction with prevailing wind. This wind interaction phenomenon indicates the wind aloft and is further discussed below. These data also show that the reflectivity patterns at different altitudes are similar.

FIGS. 5A–5F show plots of several storm-related variables and radar reflectivity. The plots are of a multicell storm aged 80 minutes taken at an altitude of 10 km. The formulas used for the calculation are described in the Appendix. FIG. 5-A shows the horizontal cross-section of radar reflectivity overlaid by horizontal wind represented by arrows. The concept of center of mass is borrowed from mechanical physics, only replacing mass with radar reflectivity. The circle 502 represents the calculated location of the center of mass. The circles 504, 506 represent the locations for maximum upward G-factor 504 and maximum downward G-factor 506, respectively. G-factor is an estimate of the aircraft vertical acceleration caused by vertical wind gusts, as expressed in units of the acceleration due to gravity.

The line 508 is drawn through the center of mass 502 and coincident with the axis of the storm along which the moment of inertia of radar reflectivity is essentially minimum. In other words, line 508 is the axis of minimum moment of inertia of the storm top and simultaneously passes through the center of mass of the storm. The concept of moment of inertia is also borrowed from mechanical physics and is the same as described in many physics and mechanical engineering books that teach mechanics, except that mass is replaced by radar reflectivity. As shown in FIG. 5-A, the radar reflectivity pattern 510 is stretched longer along axis 508 compared to the perpendicular direction. The significance of determining axis 508 is discussed below. FIGS. 5-B, 5-C, 5-D, 5-E, and 5-F represent vertical cross-sections of potential temperature, radar reflectivity, G-factor, eddy dissipation rate (EDR), and temperature, respectively. Axis 508, the line in FIG. 5-A, is contained in the vertical planes shown in each of FIGS. 5-B, 5-C, 5-D, 5-E, and 5-F. In other words, the vertical planes are cut through axis 508. The wave-like feature in potential temperature FIG. 5-B indicates gravity wave activities.

Water contents of storms freeze at altitudes above 7 km so that they are not completely wet anymore. However, radar reflectivity is calculated assuming wet water contents since there is no knowledge about the wetness of the water contents above 7 km. This wet contents assumption for these plots at least allows a picture to be painted at high altitude, especially at anvil area. Very dry hail has a range of radar reflectivity 7–13 dBZ smaller than wet hail, and very dry snow has reflectivity 36 dBZ smaller than wet snow.

Determining The Location Of Turbulence Based On Radar Reflectivity

Turbulence reflected by G-factor in FIG. 5-D and potential temperature FIG. 5-B, as well as other plots of radar reflectivity mentioned above, exists on the top of the storm, at the downwind side of the anvil area, as well as in the center of storm, the updraft and downdraft area. The center of the storm has very high radar reflectivity due to the high moisture concentration and can be identified by tilting the radar downwardly when flying at altitudes above the storm. By tilting the radar antenna downwardly, the center of the storm is found where the radar reflectivity exceeds 40–50 dBZ. Turbulence usually exists in this vertical column area at altitudes above the top of the storm. The turbulence area also extends to the downwind side at high altitudes, as discussed below. Simulation data of the Baraboo case, a fast-growing, tall airmass, indicates that the vertical growth of the convection can approach the speed of 1 km/min. Therefore, this invention is especially useful in finding the turbulence outside of a storm center based on radar power returns and radar reflectivity, and the weather radar is preferably tilted downwardly to search for the growing convective activities. Furthermore, examination of the data in FIGS. 5-A through 5-F as well as many similar data taken at different storm development stages indicates that, should pilots need to fly near the convective cells, regions of updraft top and the downwind anvil area should be avoided in favor of the upwind area.

The intensity and extent of the turbulence vary with different kind of storms. Radar reflectivity displays are an approximate description of the shape and size of a storm. Matching a series of radar returns with the stored simulation data allows the type of some typical storms to be determined. For example, radar reflectivity displays provide sufficient data to determine whether the storm is a single cell airmass, a massive supercell, or a squall line. The total radar return intensity single cell airmass is small and the area is also small. Both the intensity and the area of the radar return of a massive supercell are large. Several areas of the radar returns of squall lines display a "line" form. However, not all storms are a typical single cell airmass, a massive supercell, or a lined-up squall line. For example, the storm could be a hybrid of various cases. In such cases, data link information is useful in determining the type of storm encountered. According to the invention, additional information is used in conjunction with the radar returns to improve the accuracy of the storm classification. Preferably, the additional data are transmitted via data link to the on-board electronic devices connected to the nowcast computer and entered to the algorithm automatically. Voice data via radio and manual entry of the information into the algorithm provides other possible options.

The single-cell airmass storm does not generate much turbulence outside of its core updraft and downdraft area. A supercell storm generates stronger turbulence. Since supercell storms can last more than two hours, the turbulence can also exist for a longer time. Furthermore, turbulence associated with multicell storms exists outside of the significant radar reflectivity area. This is the kind of turbulence pilots want to avoid, but until this invention have not succeeded.

Simulated storm data indicate that dangerous turbulence is generally located downwind of the storm center. The present invention provides a novel method for processing radar return data to determine the storm center and horizontal wind direction at aircraft cruise altitudes, thereby defining the probable location of the turbulence existing outside of significant radar reflectivity area. Therefore, the processing method of the invention combines the concepts of center of mass and moment of inertia of radar reflectivity to determine upper atmosphere wind direction and locate turbulence at typical aircraft cruising altitudes.

Briefly, the nowcast method of the invention determines the center of mass and minimum moment of inertia of radar reflectivity of the storm, using these well-known and easily understood concepts from mechanical physics to define physical parameters for use in nowcast calculations. Radar reflectivity data in the upper atmosphere is used to calculate an axis of the storm which corresponds to the minimum moment of inertia and simultaneously passes through the storm center of mass. The radar reflectivity area is divided into upwind and downwind areas by a line passing through the storm center of mass perpendicular to the axis of minimum moment of inertia. A mean radar reflectivity is computed for each area. The horizontal wind direction is determined using the criteria that the area with larger mean radar reflectivity is the upperwind portion and the other area with smaller mean value is the downwind portion. This horizontal wind information is supplied to a nowcast algorithm in combination with information describing the type of storm encountered to determine the location, the probability, location, and intensity of turbulence.

FIGS. 6A through 6F show plots of radar reflectivity. The plots are of the multicell storm aged 80 minutes taken at an altitude of 6 km. Wind direction is again depicted by arrows. FIGS. 5 and 6 and other data (not shown) indicate that the mean wind of the storm tends to stretch radar reflectivity pattern 510 longer along the direction that the wind is blowing, which is used in the invention to determine the upper air wind direction and intensity. The upper air wind direction and intensity are used in turn to determine the probability, location, and intensity of turbulence. In FIG. 6-A, the upper-air wind is blowing from southwest to northeast. The mean wind vector at an altitude of 10 km points to the direction of about 14 degrees relative to the x-axis, which points east. Axis of minimum moment of inertia 508 through center of mass 502 points at an angle of about 20 degrees north of east when calculated using radar reflectivity at an altitude of 6 km, and points at an angle of about 11 degrees north of east when calculated using radar reflectivity at an altitude of 10 km. The effect of radar beam width averages the results at different altitudes, which results in axis 508 pointing close to 14 degrees relative to the x-axis, i.e., 14 degrees north of east.

In FIG. 6-D, the radar reflectivity area 510 is divided into two parts by a line 610 intersecting the circle representing center of mass 502 and perpendicular to the axis of minimum moment of inertia 508. One side has larger mean reflectivity due to a higher concentration of moisture resulting from compression by the wind, including stronger updrafts. The larger mean reflectivity indicates the upwind direction. The other side has smaller mean reflectivity because of the relatively lower concentration of moisture due to the lower wind pressure. The side with smaller mean reflectivity indicates the direction of downwind. This procedure thus removes the ambiguity of upwind and downwind direction. FIGS. 6-A through 6-F reflect the steps used in this determination. A predetermined radar reflectivity threshold of about 10 dBZ separates meaningful radar reflectivity area 510 from possible noise, as shown in FIGS. 6-B and 6-C and an algorithm divides the upwind area from the downwind area, as shown in FIGS. 6-D, 6-E, and 6-F. FIGS. 6-E and 6-F are coordinate transformations from FIG. 6-D for purposes of calculating the mean reflectivities on either side of perpendicular 610. The algorithm is preferably either one developed using traditional mathematical formulae and transformations or one of the proprietary algorithms developed and owned by Honeywell International, Incorporated, which implements the moment of inertia to divide upwind and downwind areas. However, the invention is not limited to these algorithms. Rather, other suitable algorithms may be similarly effective and are similarly considered within the scope of the invention.

As discussed above, harmful turbulence generally exists downwind of the storm center outside of the significant radar reflectivity area. FIG. 6-E illustrates the ratio of the mean reflectivities of the upwind area 652 to the downwind area 654. The ratio is an indicator of wind speed aloft. A larger ratio indicates a mean higher wind speed and stronger turbulence downwind. Similarly, modulation of the moment of inertia, defined as the ratio of minimum and maximum moments of inertia, indicates wind intensity, which in turn indicates the intensity of the turbulence. A stronger mean wind causes a longer reflectivity pattern 510 and produces a smaller modulation value. This horizontal wind information is supplied to the nowcast algorithm of the invention. Therefore, in the example shown in FIGS. 6A–6F, the nowcast algorithm of the invention would be expected to determine that the majority of the turbulence would probably be downwind or east of the storm. However, an airmass may have a smaller wind intensity than a supercell storm with the same modulation. In other words, the intensity and extent of turbulence varies also with the type of storm encountered. For example, severe supercell storms may have turbulence extending to more than 20 km to the downwind side, while single cell airmasses may have turbulence only within 10 km downwind of the storm. Therefore, these parameters are preferably used in combination with other meteorological data, such as the type of the storm.

FIGS. 7A through 7D illustrates the use of radar reflectivity to track the movement of a convective storm during its development. The ability to predict the locations of the storm allows pilots to avoid the most severe parts of the storm. FIGS. 7-A and 7-B show that the storm center locations, i.e., the respective locations of maximum updraft 710 and downdraft 712 as defined by the vertical velocity, are almost coincident with the locations of the maximum radar reflectivity 714. FIGS 7-C and 7-D show that the movement of storm center locations 710, 712 is also in the same direction as the first moment of the radar reflectivity 716, although the pace of the movement from the center of the storm is larger than that of the first moment. Calculation of the first moment of the radar reflectivity 716 smoothens the data and makes the algorithm more robust by limiting the influence of occasional imperfect data points. Other data (not shown) illustrate that the measure of the movement of the storm center is consistent regardless of the altitude at which the wind velocity is measured. The future path of the storm is predicted as a function of the track of the position maximum radar reflectivity 714 over time. Thus, the maximum radar reflectivity 714 and the first moment of the radar reflectivity 716 are additional physical storm parameters for use with the nowcast algorithm to predict the locations of convection induced turbulence.

The present invention utilizes radar reflectivity to identify convective storm features and to predict the locations and intensities of convection induced turbulence (CIT). Turbulence information such as the type and the developmental stage or maturity of the storm, the winds aloft, and the location and intensity of the convection induced turbulence, or CIT, are determined using onboard equipment to perform a combination of techniques, including automatic antenna tilt and capture of radar return information, calculation of physical storm parameters, such as moments of radar reflectivity and moments of inertia, and tracking variations in these physical parameters with time. The turbulence nowcast of the invention uses these physical storm parameters and tracking information to predict the turbulence information and to perform a turbulence index calculation. The physical storm parameters are utilized to calculate the turbulence index. As discussed above, the turbulence index is defined as the weighted and normalized summation of various combinations of predetermined physical storm parameters and derivatives thereof. Weighting factors are assigned by using experience formulae, which are developed by comparing the numbers against available flight data with real turbulence encounters. The values depend on the location of the aircraft (mountainous or flat terrain), seasons, and other parameters. However, the specifics of the turbulence index are optionally determined differently for each implementation of the invention. All such implementations are considered to be within the scope of the present invention. The turbulence index is the basis of a "nowcast" provided to the aircraft crew updating them on the possibility of encountering turbulence along the flight path.

Figure 8:
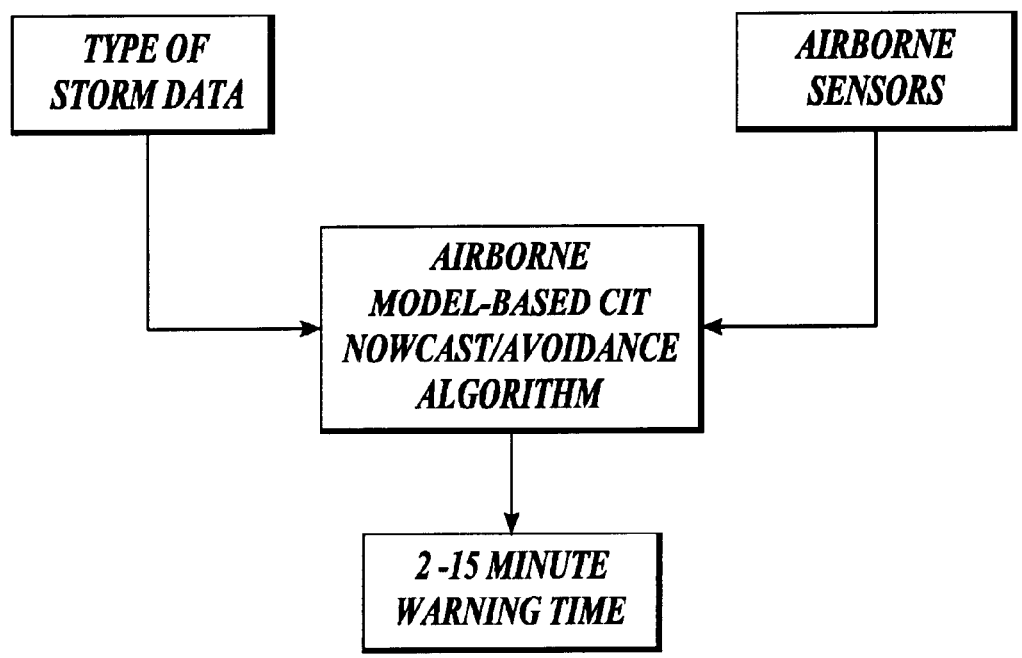
FIG. 8 is a conceptual diagram of a model-based airborne CIT nowcast/avoidance system of the invention that enables a CIT nowcast for an area about 2–15 minutes ahead of the host aircraft.

FIG. 8 is a conceptual diagram of a model-based airborne CIT nowcast/avoidance system. Inputs to the model are from onboard sensors, including an onboard weather radar system. In FIG. 8, an airborne system combines the information from the onboard weather radar system with onboard sensors to enable CIT nowcast for an area about 2–15 minutes ahead.

In practice, the nowcast algorithm of the invention receives radar power return data and an indication of the type of storm in the path of the aircraft, and processes the data to determine the physical parameters of the storm. The algorithm determines the maximum upward G-factor and maximum downward G-factor and calculates each of the center of mass, the minimum and maximum moments of inertia of the radar reflectivity, the ratio of minimum and maximum moments of inertia, the vertical velocity of the wind, the mean reflectivities of the upwind area to the downwind area and the ratio between them, and tracks variations in these parameters with time. The algorithm uses these parameters together with variations in them over time to determine convection induced turbulence information. The algorithm applies various diagnostic parameters, such as type and maturity of the storm, pattern and extent of the storm, directional motion of the storm, wind intensity, and wind speed aloft to retrieve from the storm data bank typical turbulence information that corresponds to the current weather condition. The retrieved turbulence information and the diagnostic turbulence variables are preferably applied to a short-term prediction algorithm to form a noweast that estimates the probability, intensity, and location of CIT as a function of the correlation between the returns of the on-board weather radar and the radar simulations contained in the storm data bank combined with the current diagnostic turbulence variables. The algorithm preferably calculates a Turbulence Index as discussed above. The nowcast is based on the value of the calculated turbulence index. If the calculated turbulence index for a location along the flight path exceeds a pre-defined turbulence threshold, then a turbulence warning will be issued for its location, time, and intensity. The turbulence warning is provided to cockpit instrumentation to generate aural or visual CIT nowcast alerts to a pilot.

Figure 9:
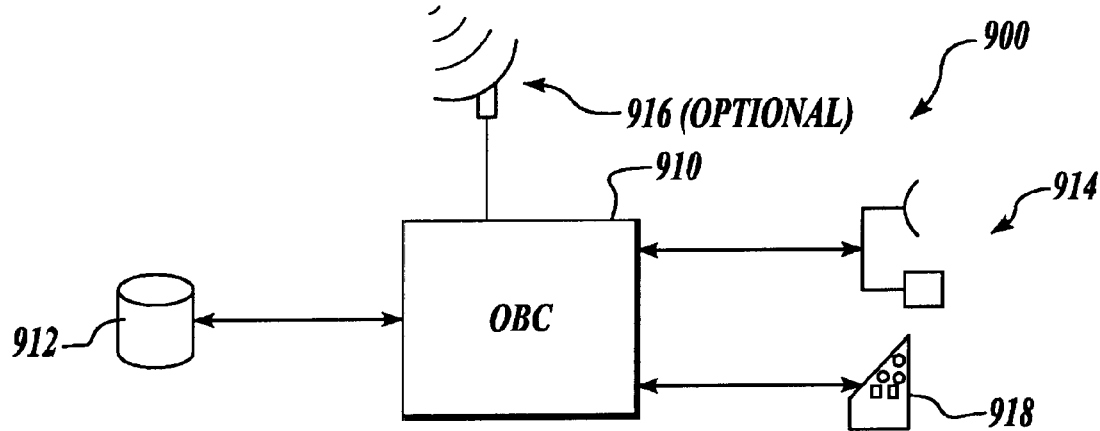
FIG. 9 illustrates the CIT nowcast system of the present invention for implementing the method of the present invention.

FIG. 9 illustrates the CIT nowcast system for implementing the method of the present invention. The CIT nowcast system 900 of the present invention is similar to the CAT system described above and show in FIG. 1E. The CIT nowcast system 900 of the present invention includes an onboard computer (OBC) 910, onboard storage 912, and onboard sensors 914. A data link 916 is optional, as described below. The onboard computer 910 processes the inputs from onboard sensors 914 to nowcast CIT along the flight path. Onboard sensors 914 include a whether radar and preferably a thermal sensor. Onboard instrumentation 918 is coupled to the onboard computer 912 to alert the pilot of CIT.

Onboard storage 912 is used to store pre-loaded nowcast algorithm and program code. Onboard computer 910 executes software that implements the CIT nowcast algorithm as described above. The nowcast information is provided to cockpit instrumentation 918 which provides aural or visual CIT nowcast alerts to a pilot. Optionally, as discussed below, a data-link 916 provides additional meteorological data to onboard computer 910.

Additional Meteorological Data

The accuracy of turbulence nowcast is optionally improved by incorporating additional meteorological data from ground and from air via data link 916. For example, although not able to be uplinked in its current format, lightning data can provide more information about the storm: severity, developmental stage, storm type, and other valuable meteorological data. Table 3 in the Appendix summarizes the relationship between storms and lighting. Satellite data is valuable for determining turbulence induced by a complex convective system, such as squall lines. Satellite data aids in determining the extent of the storm system and supplements radar detection. Wind and temperature readings from other aircraft are also optionally used to supplement or confirm radar observations made by the host aircraft.

While the preferred embodiment of the invention has been illustrated and described, it will be appreciated that various changes can be made therein without departing from the spirit and scope of the invention.

TABLE 1

Data Overview

| File No. | Storm Type | Size of Data & Resolution (horizontal and vertical) | Features |
|---|---|---|---|
| 1 | Supercell | 123 × 123 × 103<br>1 km × 1 km × 0.25 km | Coarse resolution/supercell |
| 2 | Multicell | 123 × 123 × 103<br>1 km × 1 km × 0.25km | Coarse resolution/multicell |
| 3 | Airmass | 123 × 123 × 103<br>1 km × 1 km × 0.25 km | Coarse resolution/airmass |
| 4 | Supercell | 483 × 483 × 103<br>0.25 km × 0.25 km × 0.25 km | Fine resolution/supercell |
| 5 | Multicell | 483 × 483 × 103<br>0.25 km × 0.25 km × 0.25 km | Fine resolution/multicell |
| 6 | Airmass | 483 × 483 × 103<br>0.25 km × 0.25 km × 0.25 km | Fine resolution/airmass |
| 7 | Baraboo | 123 × 123 × 103<br>1 km × 1 km × 0.25 km | Fast-growing tall airmass |
| 8 | Utopia | 123 × 123 × 103<br>1 km × 1 km × 0.25 km | Short supercell |

TABLE 2

Output Variables from ARPS Model

| variable name | name in GRIB format | explanation |
|---|---|---|
| u | UGRD | east-west wind velocity [m/s] |
| v | VGRD | north-south wind velocity [m/s] |
| w | DZDT | vertical wind velocity [m/s] |
| qv | SPFH | water vapor mixing ratio [g/kg] |
| qc | CLWMR | cloud water mixing ratio [g/kg] |
| qr | var170 | rain water mixing ratio [g/kg] |
| qi | var178 | cloud ice mixing ratio [g/kg] |
| qs | var171 | snow mixing ratio [g/kg] |
| qh | var179 | hail mixing ratio [g/kg] |
| tke | TKE | turbulent kinetic energy [m$^2$/s$^2$] |
| Tp | POT | potential temperature [°K] |
| P | PRES | pressure [mb] |

TABLE 3

Relations of Convective Storms and Lightning

| Lightning Phenomena | Use in Deriving Storm and Turbulence Features | Supplemental Information to Radar Returns and Other Sensor Returns | Requirement On Lightning Measurement |
|---|---|---|---|
| Lightning rate for supercell: 10–40 per minute overall and 5–12 per minute for cloud to ground lightning (CG). Single-cell and multicell: 2–10 per minute overall and 1–5 per minute for CGs. Average/maximum CG rate in Tampa Bay area is: 1.7/3.7 for single-peak storms, 3.4/7.3 for multiple-peak, and 6.8/14 for storm systems. | Type of storm: supercell, single-cell, and multicell | To supplement radar return information to determine the storm type | Capability to measure lightning rate |
| In central Florida, rapid changes in flash rate indicate storms becoming severe. Average one-minute flash rate increases from 56 fpm to 189 fpm in 6.5 minutes. During the time of severe weather, 120–550 fpm (Hodanish and Goodman[3]). | Severity and stage of storm | rate (100 per minute) | Capability to measure flash |
| In single-cell and multicell storms, positive CGs are associated with dissipating cells. In supercell storms, | Maturity of storm | | Capability to measure the polarity of the |

TABLE 3-continued

Relations of Convective Storms and Lightning

| Lightning Phenomena | Use in Deriving Storm and Turbulence Features | Supplemental Information to Radar Returns and Other Sensor Returns | Requirement On Lightning Measurement |
|---|---|---|---|
| positive CGs occur in mature as well as dissipating stages of the storm. | | | lightning |
| Only negative CGs observed in the precipitation core. | Location of storm - if positive CG is observed, location cannot be precipitation core | Area with largest radar return considered the precipitation core, if negative CGs are present at that location | Location and polarity of the CGs |
| For small cumulonimbus cloud, intracloud lightning (IC) in earlier stages transfer negative charges from mid-level to upper level. CGs in the mature stage transfer negative charges from mid-level to ground. | Maturity of storm | If radar returns and other sensor returns indicate single-cell storm, this information aids determination of stages of storm | Location and polarity of a lightning |
| Small storms more likely to produce vertical intracloud discharges, and large mature and dissipating storms produce horizontal discharges. | Size and developmental stages of storm: updraft, mature, dissipation. | Infer whether radar returns are heavily attenuated | Direction of discharge |
| Location of negative charge centers is typically at the same cloud temperature level: −10 to −34 C., the actual height depends on local terrain features. | Deduce vertical extent of storm from determination of charge center altitude by lightning detection | Explain radar returns from various tilt angles when combined with local terrain information | Capability to determine vertical position of charge center (i.e., where the lightning starts). |
| Positive lightning is more frequent where freezing level is closer to ground and where there is strong wind shear horizontally separating upper positive and lower negative cloud charge centers. Conditions favoring positive flashes: high elevations, cold weather, high latitudes, and severe storms. | Windshear information and probability of turbulence when combined with temperature measurement and radiometer measurement | | Capability to measure polarity, location, and rate of lightning |
| Percentage of positive flashes to the ground increases with the age of the storm, reaching 37% in the last hour of significant activity. | Developmental stages of storm | Identify which area in radar returns are updraft, mature, or dissipating in multicell | Measurement accuracy of lightning rate, polarity, and location |
| Turbulent eddies of air less than 50 meters in diameter scatter the sound waves. Hence, when thunder from a low-energy lightening flash travels several kilometers through turbulent air, it may become inaudible. | | | Detection of turbulence |

Other facts:
1. The spatial resolution of lightning detection is 100 km using optical method from Earth-orbiting satellites, and 10 km using radio frequency detection. The Lightning Discharge, by Martin A. Uman, Academic Press 1987.
2. The value of electric field intensity for electrical breakdown between plane, parallel electrodes at sea level in dry air is about $3\times10^6$ V/m. Cloud Dynamics, by Robert A. Houze, Jr., Academic Press 1993.
3. According to Don MacGorman, the National Lightning Detection Network provides the following parameters regarding ground strikes: the location of the strike within 1–2 km radius accuracy, the peak current, an the polarity of the lightning. By 2005, satellite image will provide total lightning map, with 8-km resolution. Hodanish and Goodman et al, "Observations of total lightning associated with severe convection during the wet season in central Florida."
4. NSSL is developing techniques to overlay NEXRAD data and lightning data to better understand storms and use weather information. Conversation with Don MacGorman, Conrad Ziegler, Jerry Straka, and Ed Mansell, Sep. 30, 1999.

Formulas Used to Calculate Derived Variables:
The magnitude of G-factor is estimated using the following formula:

$|G|$=aircraft speed*max $|dW/dx, dW/dy|/g$ where:

aircraft speed of 250 m/s is used,

W is the vertical wind velocity, x and y are the horizontal coordinates, and g is acceleration constant 9.8 m/s$^2$.

Turbulence usually occurs on the top the updraft (slightly toward the downwind side) and in the anvil, mostly within 20 km downwind from the center of the updraft.

EDR is calculated using the following formula:

$$EDR=0.93*TKE\char`\^1.5/L$$

where:

L is the scale length estimated as $(dx*dy*dz)\char`\^(1/3)$, and

TKE is the subgrid turbulence kinetic energy.

Temperature is derived from the potential temperature and pressure as:

$$T=Tp*(P/10\char`\^5)\char`\^(Rd/Cp)$$

where: the gas constant Rd=287 J/kg/K and the specific heat at constant pressure Cp=1004 J/kg/K.

Radar reflectivity is calculated as following:

$$\text{Reflectivity (dBZ)}=10*Log(R\_rain+R\_snow+R\_hail),$$

where:

$$R\_rain=8.694e3*(\rho*qr)\char`\^(7/4),$$

$$R\_snow=2.706e4*(\rho*qs)\char`\^(7/4),$$

$$R\_hail=3.436e4*(\rho*qh)\char`\^(7/4), \text{ and}$$

$$\rho=[p/(Rd*T)]*[1-qv/(0.622+qv)]*(1+qv+qr+qi+qh).$$

The 1st moment of radar reflectivity is calculated as:

$$\text{First moment} = \frac{\text{Summation (radar reflectivity} * \text{distance from origin)}}{\text{Summation (radar reflectivity)}}.$$

The moment of inertia of radar reflectivity is defined as:

moment of inertia=Summation (radar reflectivity*distance squared from an axis).

Moment of inertia is alternatively calculated with high efficiency methods, for example, one of the proprietary algorithms developed and owned by Honeywell International, Incorporated.

What is claimed is:

1. A convection induced turbulence nowcast system comprising:

a memory for storing a signal representative of a radar power return from a weather condition; and a processor coupled to said memory and adapted to:
 a) process said radar power return signal to provide spatial and temporal weather condition information,
 b) determine physical parameters of said weather condition as a function of said spatial and temporal whether condition information, and
 c) process said physical parameters as a function of predetermined diagnostic parameters to determine turbulence information and generate a nowcast of convection induced turbulence.

2. The nowcast system recited in claim 1, wherein:

said processor is further adapted to determine a turbulence index as a function of said turbulence information; and said nowcast is further generated as a function of said turbulence index.

3. The nowcast system recited in claim 2, wherein:

said memory further stores convection induced turbulence information as a function of predetermined weather condition features; and said processor is further adapted to:
 extract features from said radar power return corresponding to said predetermined weather condition features, and
 retrieve from said memory ones of said convection induced turbulence information corresponding to said extracted features.

4. The nowcast system recited in claim 3, wherein said turbulence index further comprises a weighted and normalized summation of various combinations of said diagnostic parameters.

5. The nowcast system recited in claim 3, wherein said physical parameters further comprise one or more of:

a center of mass, a maximum upward G-factor, a maximum downward G-factor, a minimum moment of inertia of the radar reflectivity, a maximum moment of inertia of the radar reflectivity, a ratio of said minimum and maximum moments of inertia, a vertical velocity of wind, a maximum radar reflectivity, a first moment of the radar reflectivity, a mean reflectivity of an upwind area, a mean reflectivity of a downwind area, and a ratio between said mean reflectivity of upwind area and said downwind area.

6. The nowcast system recited in claim 3, wherein said diagnostic parameters further comprise one or more of a pattern of said weather condition, an extent of said weather condition, an intensity of said weather condition, maturity of said weather condition, and a motion of said weather condition.

7. The nowcast system recited in claim 3, wherein:

said processor is further coupled to receive a signal representative of additional meteorological data; and said processor is further adapted to process said additional meteorological data in combination with said turbulence information to generate said nowcast of convection induced turbulence.

8. The nowcast system recited in claim 7, wherein said additional meteorological data further comprise data indicative of one or more of a severity of the weather condition, a developmental stage of the weather condition, and a type of the weather condition.

9. The nowcast system recited in claim 8, wherein said additional meteorological data further comprise lightning data.

10. The nowcast system recited in claim 3, wherein:

said signal representative of a radar power return from a weather condition further comprises a radar reflectivity of said weather condition;

said physical parameters further comprise a center of mass and a minimum moment of inertia of radar reflectivity of the storm; and said processing of said physical parameters further comprises:
a) dividing said radar reflectivity into a plurality of areas,
b) computing a mean radar reflectivity for each said area, and
c) determining a horizontal wind direction as a function of said computed mean radar reflectivities.

11. The nowcast system recited in claim 10, wherein:
said dividing said radar reflectivity into a plurality of areas further comprises computing a perpendicular to said axis of minimum moment of inertia passing through said storm center of mass; and
said plurality of areas further comprise one area positioned on each side of said perpendicular.

12. The nowcast system recited in claim 11, wherein said determining a horizontal wind direction further comprises determining a relative reflectivity between said computed mean radar reflectivities.

13. A nowcast system for predicting convection induced turbulence occurring along the flight path of a host aircraft, the system comprising:
on-board storage for storing convection induced turbulence data as a function predetermined weather condition features; and
an on-board computer coupled to said on-board storage and adapted to receive a signal representative of a radar power return of a weather condition in the flight path of the aircraft from an on-board radar system, said computer executing software commands to:
a) extract key features from said radar power return spatial and temporal weather condition,
b) retrieve convection induced turbulence data corresponding to said extracted features,
c) compute predetermined physical parameters of said weather condition as a function of said spatial and temporal whether condition information,
d) apply predetermined diagnostic parameters to said physical parameters to determine diagnostic turbulence variables,
e) generate a nowcast of convection induced turbulence as a function of said retrieved convection induced turbulence data and said diagnostic turbulence variables.

14. The nowcast system recited in claim 13, wherein said nowcast further comprises an estimate of one or more of a probability, an intensity, and a location of convection induced turbulence.

15. The nowcast system recited in claim 14, wherein computing predetermined physical parameters of said weather condition as a function of said spatial and temporal whether condition information further comprises:
a) determining a position of maximum radar reflectivity,
b) tracking said position of maximum radar reflectivity over a predetermined time period, and
c) applying said position tracking information to a short-term prediction algorithm.

16. The nowcast system recited in claim 15, wherein said computing predetermined physical parameters of said weather condition as a function of said spatial and temporal whether condition information further comprises determining a first moment of said radar reflectivity.

17. The nowcast system recited in claim 14, wherein said generating a nowcast of convection induced turbulence further comprises applying said diagnostic turbulence variables to a short-term prediction algorithm.

18. The nowcast system recited in claim 17, wherein said generating a nowcast of convection induced turbulence further comprises computing a turbulence index as a function of predetermined weighting factors.

19. A nowcast system located on-board an aircraft for nowcasting convection induced turbulence events occurring along the flight path of the aircraft, said system comprising:
on-board storage for storing observational data, and program data including convection induced turbulence data as a function of predetermined weather condition features;
an on-board radar unit for detecting meteorological data ahead of the aircraft;
an on-board computer coupled to the on-board storage and on-board sensors to execute program code to:
a) process said meteorological data to extract one or more key features,
b) retrieve said convection induced turbulence data as a function of said key features,
c) compute physical parameters of a weather condition contained in said meteorological data,
d) process said physical parameters as a function of predetermined diagnostic parameters to determine one or more diagnostic variables, and
e) generate a nowcast of convection induced turbulence as a function of said retrieved convection induced turbulence data and said diagnostic variables.

20. The nowcast system recited in claim 19, wherein said generating a nowcast of convection induced turbulence further comprises operating a short-term prediction algorithm.

21. The nowcast system recited in claim 20, wherein said generating a nowcast of convection induced turbulence further comprises computing a turbulence index as a function of predetermined weighting factors.

22. The nowcast system recited in claim 21, wherein said nowcast further comprises an estimate of one or more of a probability, an intensity, and a location of convection induced turbulence.

23. The on-board nowcast system recited in claim 19, further comprising:
a means for receiving data from data sources external to the aircraft;
with the on-board computer storing said data in the on-board storage and utilizing said data as observational data.

24. The on-board nowcast system recited in claim 23, further comprising instrumentation, coupled to said on-board computer, for providing one of an aural and a visual indication of convection induced turbulence occurring ahead of the aircraft.

25. The on-board nowcast system recited in claim 24, wherein said on-board computer executes program code to include said data from data sources external to the aircraft in said observational data.

26. A method for using an electronic circuit to generate a convection induced turbulence nowcast using meteorological data conveyed as a radar power return signal, the method comprising:
a) processing the signal as a radar power return signal;
b) with the electronic circuit, extracting key features from said radar power return signal, including spatial and temporal information thereof;
d) with the electronic circuit, retrieving convection induced turbulence information as a function of said key features;

e) with the electronic circuit, computing predetermined physical parameters of said meteorological data as a function of said spatial and temporal information;

f) with the electronic circuit, applying predetermined diagnostic parameters to said physical parameters to determine diagnostic turbulence variables, and g) with the electronic circuit, generating a nowcast of convection induced turbulence as a function of said retrieved convection induced turbulence data and said diagnostic turbulence variables.

27. The method recited in claim 26, wherein said generating a nowcast of convection induced turbulence further comprises applying said diagnostic turbulence variables to a short-term prediction algorithm.

28. The method recited in claim 27, wherein said nowcast further comprises an estimate of one or more of a probability, an intensity, and a location of convection induced turbulence.

29. The method recited in claim 28, wherein said generating a nowcast of convection induced turbulence further comprises computing a turbulence index as a function of predetermined weighting factors.

30. A method for determining a horizontal wind direction at aircraft cruise altitudes, the method comprising:

determining radar reflectivity of a weather condition as a function of a radar power return from the weather condition;

computing each of a center of mass and a minimum moment of inertia of said radar reflectivity;

dividing said radar reflectivity into a plurality of areas;

computing a mean radar reflectivity for each said area; and determining a relative reflectivity between said computed mean radar reflectivities.

31. The nowcast system recited in claim 30, wherein said dividing said radar reflectivity into a plurality of areas further comprises:

computing a perpendicular to said axis of minimum moment of inertia passing through said storm center of mass; and dividing said radar reflectivity into areas positioned on opposing sides of said perpendicular.

32. The nowcast system recited in claim 31, further comprising supplying said horizontal wind direction information to a system for nowcasting convection induced turbulence.

* * * * *